US012107353B1

(12) United States Patent
Olsson et al.

(10) Patent No.: US 12,107,353 B1
(45) Date of Patent: *Oct. 1, 2024

(54) MULTIFUNCTION BURIED UTILITY LOCATING CLIPS

(71) Applicant: SeeScan, Inc., San Diego, CA (US)

(72) Inventors: Mark S. Olsson, La Jolla, CA (US); Allen P. Hoover, San Diego, CA (US); James F. Kleyn, Santee, CA (US); Jan Soukup, San Diego, CA (US)

(73) Assignee: SeeScan, Inc., San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/368,510

(22) Filed: Nov. 27, 2023

Related U.S. Application Data

(63) Continuation of application No. 17/013,831, filed on Sep. 7, 2020, now Pat. No. 11,769,956, which is a continuation of application No. 16/144,878, filed on Sep. 27, 2018, now Pat. No. 10,777,919.

(60) Provisional application No. 62/564,215, filed on Sep. 27, 2017.

(51) Int. Cl.

| | |
|---|---|
| ***H01R 11/24*** | (2006.01) |
| ***H01R 4/26*** | (2006.01) |
| ***H01R 4/48*** | (2006.01) |

(52) U.S. Cl.
CPC ............... *H01R 11/24* (2013.01); *H01R 4/26* (2013.01); *H01R 4/4863* (2013.01)

(58) Field of Classification Search
CPC ......... H01R 4/26; H01R 4/4863; H01R 11/24
USPC ....................................................... 439/39, 258
See application file for complete search history.

(56) References Cited

U.S. PATENT DOCUMENTS

| | | | | |
|---|---|---|---|---|
| 6,638,101 | B1 * | 10/2003 | Botelho | H01R 11/24 439/829 |
| 7,252,210 | B1 * | 8/2007 | Schultz | B65D 83/208 222/174 |
| 8,717,028 | B1 * | 5/2014 | Merewether | G01V 3/15 24/499 |
| 9,632,199 | B2 * | 4/2017 | Olsson | G01V 3/15 |
| 10,777,919 | B1 * | 9/2020 | Olsson | H01R 4/4863 |
| 11,769,956 | B1 * | 9/2023 | Olsson | H01R 11/24 439/39 |
| 2005/0247523 | A1 * | 11/2005 | Sewell | B26B 13/22 182/187 |

* cited by examiner

*Primary Examiner* — Gary F Paumen
(74) *Attorney, Agent, or Firm* — Steven C. Tietsworth, Esq.; Michael J. Pennington, Esq.

(57) ABSTRACT

Electrical contact clips for use in utility locating operations to couple signals from a transmitter to a hidden or buried utility via direct electrical contact are disclosed.

20 Claims, 31 Drawing Sheets

MULTIFUNCTION BURIED UTILITY LOCATING CLIPS

CROSS-REFERENCE TO RELATED APPLICATIONS

This application is a continuation of and claims priority to co-pending U.S. Utility patent application Ser. No. 16/144,878, entitled MULTIFUNCTION BURIED UTILITY LOCATING CLIPS, filed Sep. 27, 2018, which claims priority under 35 U.S.C. § 119 (e) to U.S. Provisional Patent Application Ser. No. 62/564,215, entitled MULTIFUNCTION BURIED UTILITY LOCATING CLIPS, filed Sep. 27, 2017. The content of each of these applications is hereby incorporated by reference herein in its entirety for all purposes.

FIELD

This disclosure relates generally to electrical direct contact clips used to couple electrical current signals between devices, such as between a buried utility locator transmitter and a hidden or buried utility or other conductors. More specifically, but not exclusively, this disclosure relates to clips for performing multiple functions when used in utility locating operations.

BACKGROUND

Crocodile, alligator, or pincer electrical direct contact clips have long been used to establish electrical contacts for coupling electrical current signals in electrical circuits and between electronic devices such as utility locating transmitters and electrical conductors. Such clips are often spring loaded and have serrated jaws for gripping and holding onto a target conductive object. For example, automotive jumper cables generally employ two pairs of serrated jaw clips connected to thick wires to transfer large electrical currents from one battery's terminals to a discharged battery's terminals. Likewise, electrical testing equipment often uses smaller clips to establish a non-permanent electrical connection to target electronics being tested for continuity, voltage, and the like. Such clips are limited in configurability for a single, specific use.

In these applications, such as jump starting a car or testing electronics, existing clips are well suited due to the limited conditions and ways in which the clips need to attach to their target and/or the limited range of size of the target's connection point or terminal. However, in other applications, such as in buried utility locate operations, establishing a direct electrical connection may be difficult due to variability in conditions under which the connection needs to be made. For example, targeted utilities come in various diameters and shapes, utilities may be covered in dirt, paint, rust, or other coatings, the utility may be located in a difficult to reach place, and so on.

In the utility locating field, various clip devices are used in combination with utility locating transmitters (also denoted herein as a "utility transmitter" or "transmitter" for brevity) to couple output current signals generated by the transmitter to a targeted utility. Another type of device, commonly known as an inductive clamp, couples current signals from a transmitter to a utility or other conductor inductively, without the need for a direct physical contact. In either case, the coupled current signals then radiate corresponding magnetic fields. The magnetic fields may then be received and processed by a magnetic field sensing utility locator (also referred to herein as "utility locator" or "locator" for brevity) to determine the location, depth, relative position, current magnitude and/or phase, and/or other information about the utility or other conductor.

In general, practitioners of the art refer to a "clip" as a device used to electrically couple signals through direct conductor to conductor contact, whereas a "clamp" couples signals without direct contact (e.g., through inductive or in some case capacitive coupling). In many utility locating operations a direct conductor to conductor connection provided by a clip is preferable for coupling the signal to a target utility if the conductive path has low resistance (e.g., by providing better strength of magnetic field signals due to higher current, improved isolation of the utility line at the locator, etc.). However, clamps can be useful when no direct connection is available, such as for utilities entirely buried underground, by using AC electromagnetic fields to induce current flow into the target conductor.

As noted above, existing utility locating clips are typically simple alligator or pincer clips, similar to what is used in other electrical connection applications. They are limited in configurability for use, have a limited range of diameters onto which they can secure, are limited to utility lines or other targets of limited size and shape (such as those within arm's reach of a user), and lack any additional functionality beyond simply transferring current onto the target utility through direct electrical connection.

Accordingly, there is a need in the art to address the above-described as well as other problems.

SUMMARY

This disclosure relates generally to clips for use in coupling electrical signals directly onto hidden or buried utility lines or other conductors while performing utility locating operations. More specifically, but not exclusively, this disclosure relates to multifunction clips configurable for a multitude of uses during utility locating operations.

For example, in one aspect the disclosure relates to a multifunction clip device for use in utility locate operations. The clip may include a base assembly having a handle element and a utility selector element wherein a double-acting jaw assembly may be secured onto the base assembly. Each jaw of the double-acting jaw assembly may be independently movably opened and further closed through a spring or other tension loaded closing element to grab and hold onto a target utility. The clip may further include a contact element on the jaw assembly to directly couple electrical signal or signals onto a target utility, which may be serrated conductive teeth in various locations within and on the outside of the jaw assembly. A magnetic element may further be disposed on the jaw element providing an attraction force in securing or aiding in securing the contact element to a target utility. The magnetic elements within each jaw may be oriented to attract to one another and assist in closing and holding closed the double-acting jaw assembly.

Various additional aspects, features, and functions are described below in conjunction with FIGS. 1 through 12 of the appended Drawings.

BRIEF DESCRIPTION OF THE DRAWINGS

The present application may be more fully appreciated in connection with the following detailed description taken in conjunction with the accompanying Drawings, wherein.

DETAILED DESCRIPTION OF EMBODIMENTS

Overview

Figure 1:
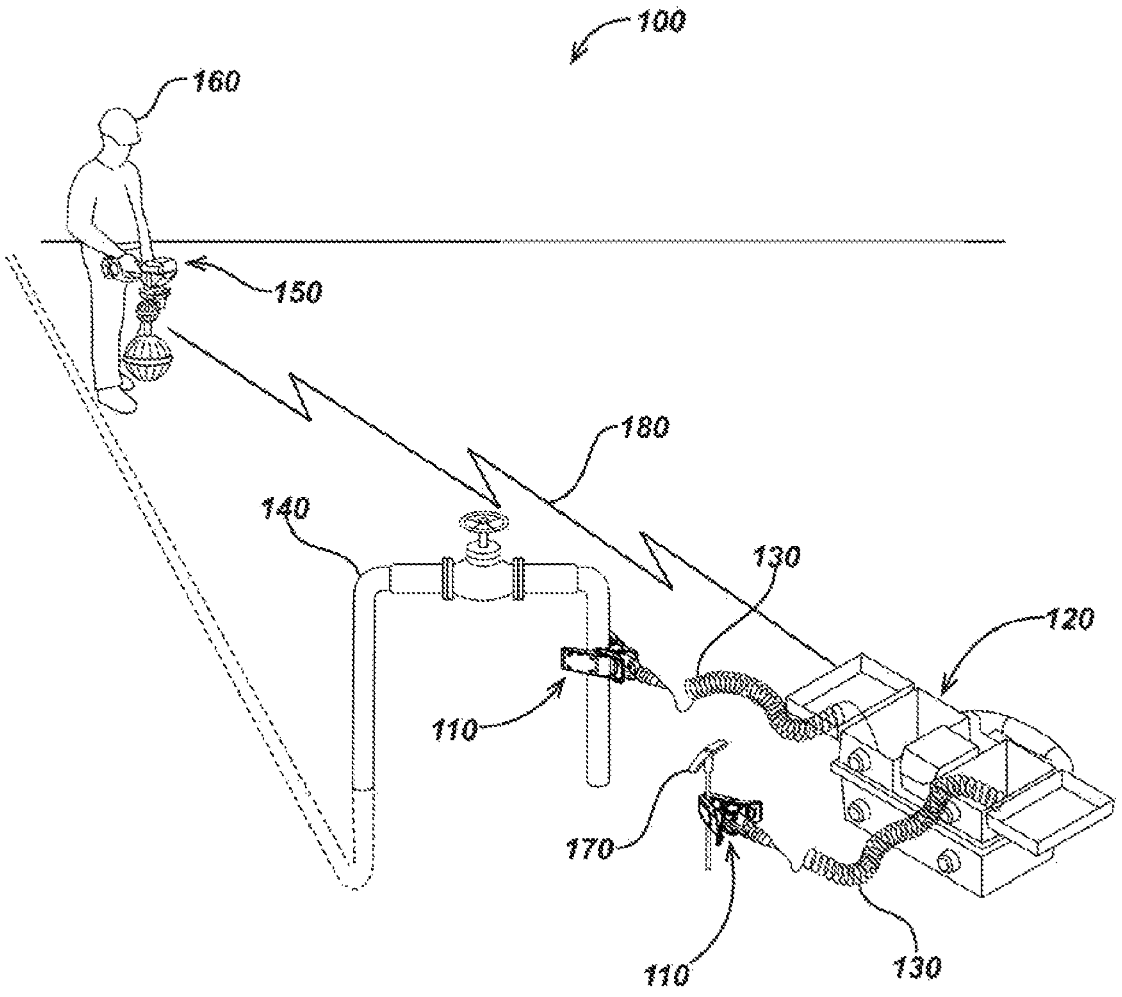
FIG. 1 is an illustration of a utility locating system embodiment utilizing a multifunction clip device.

This disclosure relates generally to clip devices used to couple electrical signals directly onto utility lines or other conductors. More specifically, but not exclusively, this disclosure relates to multifunction clip devices configurable for multiple uses in utility locating operations.

For example, in one aspect the disclosure relates to a multifunction clip device for use in utility locate operations. The clip device may include a base assembly having a handle element and a utility selector element wherein a double-acting jaw assembly may be secured onto the base assembly. Each jaw of the double-acting jaw assembly may be independently movably opened and further closed through a spring or other tension loaded closing element to grab and hold onto a target utility. The clip may further include a contact element on the jaw assembly to directly couple electrical signal or signals onto a target utility, which may be serrated conductive teeth in various locations within and on the outside of the jaw assembly. A magnetic element may further be disposed on the jaw element providing an attraction force in securing or aiding in securing the contact element to a target utility. The magnetic elements within each jaw may be oriented to attract to one another and assist in closing and holding closed the double-acting jaw assembly.

In another aspect, the double-acting jaw assembly may include a multitude of regions contoured such that each section may fit about target utilities of different utility line types or diameters. For instance, a front region may be contoured to fit about small diameter (e.g., utility lines of an approximately 1 inch outer diameter) utilities, whereas a rear region of the jaw assembly may be contoured to fit about medium diameter utility lines (e.g., utility lines having an outer diameter between 1 and 2.5 inches). Likewise, the clip device may have regions specifically configured for connecting to ground stakes, wires, large diameter conductors (e.g., utility lines having an outer diameter between 2.5 and 6 inches), using the magnetic elements in each jaw, and connection along the external surface of the clip device using the magnetic element within one of the jaws to connect with conductors that may otherwise not fit within the double-acting jaw assembly.

In another aspect, the contact element includes a series of serrated conductive teeth for gripping onto a target utility. Beyond gripping onto a target utility, the serrated conductive teeth may further allow the contact element to break through paint, corrosion, or other materials coating the utility, allowing the contact element to establish a good electrical contact with the target utility. The serrated conductive teeth, and/or other contact element, may be positioned within the different contoured regions, protruding from the front opening of the jaw assembly and/or along the outer surface of each jaw. The serrated teeth protruding from the front opening of the jaw assembly may do so in an angled bucktoothed fashion allowing the clip device to clip to small screw or bolt heads, wires, or other like small targets that may otherwise be difficult to grasp. The serrated teeth along the outer surface of each jaw may allow a user to establish an electrical contact between the clip device and a conductive target utility. In such uses, the magnetic element may secure the clip device to the conductive target utility through magnetic attraction.

In another aspect, the clip device may include foldable covers that may cover the serrated teeth along the outer surface of each jaw when not in use. The cover may, when folded out, further provide mechanical leverage allowing a user to more easily open the double-acting jaw element of the clip device.

In another aspect the clip devices of the present disclosure may include an illumination element to illuminate the work area. In some embodiments, the illumination element may be actuated upon opening of at least one jaw of the jaw assembly. The illumination element may, for instance, include one or more LEDs. The one or more LEDs may illuminate upon opening one or more jaws of the jaw assembly. For instance, the contact element may complete a circuit when the jaw assembly is closed or otherwise in contact with a conductive target utility. Upon opening the jaw assembly, the circuit may be broken. The illumination element may be configured to illuminate upon breaking of this circuit.

In another aspect, the tension loaded closing element, which may include one or more springs on each jaw of the jaw assembly, may allow the jaw assembly to close and grip the target utility. The travel of the tension loaded closing element may be substantially limited to or near the neutral plane at which the jaws come together when closed. In some embodiments, each jaw may be permitted travel just beyond the neutral plane (e.g., three degrees beyond the neutral plane) allowing the jaws to close firmly.

In another aspect, closing and firmly holding of the jaws closed may be assisted by magnets within each individual jaw with polarities oriented such that the magnetic attractive force may aid in pulling and holding the jaws closed. The magnets may assist or, in some uses, fully support the weight of the clip device in holding the clip device to a target utility.

In another aspect, the tension loaded closing element may be or include coil springs. Current signals and/or data signals may be carried by the coil springs or other tension loaded closing element to the contact elements within each jaw.

In another aspect, the present disclosure may include an extension pole accessory allowing the clip device to be used in difficult or otherwise out of reach target utilities.

In another aspect, the clip device of the present disclosure may include one or more attachment accessory devices and accessory ports for attaching such devices. Such attachment accessory devices may be used to couple current signals onto one or more target utilities in situations wherein a specialized connection may be useful or necessary. The one or more attachment accessory ports may be found within the jaws and/or along the outside of the jaws near the magnets within the jaws allowing the attachment accessory devices to attach through magnetic attraction force. Each magnet may be electrically conductive such that an electrical pathway may be established between the magnet, and thereby clip device, and connected attachment accessory device. Some such attachment accessory devices may include an insulation punch that may secure both physically and electrically to the clip device and puncture the insulation of wiring to establish an electrical connection between the clip device and conductor within the wire. Another attachment accessory device may include an additional accessory clip. The attachment accessory clip devices may independently transfer current signal(s) onto different (or optionally the same) target utilities.

In another aspect, the clip devices of the present disclosure may include one or more indicators for communicating information to the user. In at least one clip device embodiment, the indicator may include one or more LEDs for communicating information to the user. In other embodiments, acoustic devices, graphical user interfaces, or the like may be included on a clip device in keeping with the present disclosure.

Various additional aspects, features, and functions are described below in conjunction with FIGS. 1 through 12 of the appended Drawings.

The disclosures herein may be combined in various embodiments with the disclosures in co-assigned patents and patent applications, including transmitter and locator devices and associated apparatus, systems, and methods, as are described in co-assigned patents and patent applications including: U.S. Pat. No. 6,545,704, issued Apr. 7, 1999, entitled VIDEO PIPE INSPECTION DISTANCE MEASURING SYSTEM; U.S. Pat. No. 5,939,679, issued Aug. 17, 1999, entitled VIDEO PUSH CABLE; U.S. Pat. No. 6,831,679, issued Dec. 14, 2004, entitled VIDEO CAMERA HEAD WITH THERMAL FEEDBACK LIGHTING CONTROL; U.S. Pat. No. 6,862,945, issued Mar. 8, 2005, entitled CAMERA GUIDE FOR VIDEO PIPE INSPECTION SYSTEM; U.S. Pat. No. 6,908,310, issued Jun. 21, 2005, entitled SLIP RING ASSEMBLY WITH INTEGRAL POSITION ENCODER; U.S. Pat. No. 6,958,767, issued Oct. 25, 2005, entitled VIDEO PIPE INSPECTION SYSTEM EMPLOYING NON-ROTATING CABLE STORAGE DRUM; U.S. Pat. No. 7,009,399, issued Mar. 7, 2006, entitled OMNIDIRECTIONAL SONDE AND LINE LOCATOR; U.S. Pat. No. 7,136,765, issued Nov. 14, 2006, entitled A BURIED OBJECT LOCATING AND TRACING METHOD AND SYSTEM EMPLOYING PRINCIPAL COMPONENTS S ANALYSIS FOR BLIND SIGNAL DETECTION; U.S. Pat. No. 7,221,136, issued May 22, 2007, entitled SONDES FOR LOCATING UNDERGROUND PIPES AND CONDUITS; U.S. Pat. No. 7,276,910, issued Oct. 2, 2007, entitled A COMPACT SELF- TUNED ELECTRICAL RESONATOR FOR BURIED OBJECT LOCATOR APPLICATIONS; U.S. Pat. No. 7,288,929, issued Oct. 30, 2007, entitled INDUCTIVE CLAMP FOR APPLYING SIGNAL TO BURIED UTILITIES; U.S. Pat. No. 7,298,126, issued Nov. 20, 2007, entitled SONDES FOR LOCATING UNDERGROUND PIPES AND CONDUITS; U.S. Pat. No. 7,332,901, issued Feb. 19, 2008, entitled LOCATOR WITH APPARENT DEPTH INDICATION; U.S. Pat. No. 7,336,078, issued Feb. 26, 2008, entitled MULTI-SENSOR MAPPING OMNIDIRECTIONAL SONDE AND LINE LOCATORS; U.S. Pat. No. 7,443,154, issued Oct. 28, 2008, entitled MULTI-SENSOR MAPPING OMNIDIRECTIONAL SONDE AND LINE LOCATOR; U.S. Pat. No. 7,498,797, issued Mar. 3, 2009, entitled LOCATOR WITH CURRENT-MEASURING CAPABILITY; U.S. Pat. No. 7,498,816, issued Mar. 3, 2009, entitled OMNIDIRECTIONAL SONDE AND LINE LOCATOR; U.S. Pat. No. 7,518,374, issued Apr. 14, 2009, entitled RECONFIGURABLE PORTABLE LOCATOR EMPLOYING MULTIPLE SENSOR ARRAYS HAVING FLEXIBLE NESTED ORTHOGONAL ANTENNAS; U.S. Pat. No. 7,557,559, issued Jul. 7, 2009, entitled COMPACT LINE ILLUMINATOR FOR LOCATING BURIED PIPES AND CABLES; U.S. Pat. No. 7,619,516, issued Nov. 17, 2009, entitled SINGLE AND MULTI-TRACE OMNIDIRECTIONAL SONDE AND LINE LOCATORS AND TRANSMITTER USED THEREWITH; U.S. patent application Ser. No. 12/704,808, filed Feb. 12, 2010, entitled PIPE INSPECTION SYSTEM WITH REPLACEABLE CABLE STORAGE DRUM; U.S. Pat. No. 7,733,077, issued Jun. 8, 2010, entitled MULTI-SENSOR MAPPING OMNIDIRECTIONAL SONDE AND LINE LOCATORS AND TRANSMITTER USED THEREWITH; U.S. Pat. No. 7,741,848, issued Jun. 22, 2010, entitled ADAPTIVE MULTICHANNEL LOCATOR SYSTEM FOR MULTIPLE PROXIMITY DETECTION;

U.S. Pat. No. 7,755,360, issued Jul. 13, 2010, entitled PORTABLE LOCATOR SYSTEM WITH JAMMING REDUCTION; U.S. Pat. No. 7,825,647, issued Nov. 2, 2010, entitled METHOD FOR LOCATING BURIED PIPES AND CABLES; U.S. Pat. No. 7,830,149, issued Nov. 9, 2010, entitled AN UNDERGROUND UTILITY LOCATOR WITH A TRANSMITTER A PAIR OF UPWARDLY OPENING POCKETS AND HELICAL COIL TYPE ELECTRICAL CORDS; U.S. Pat. No. 7,863,885, issued Jan. 4, 2011, entitled SONDES FOR LOCATING UNDERGROUND PIPES AND CONDUITS; U.S. Pat. No. 7,948,236, issued May 24, 2011, entitled ADAPTIVE MULTICHANNEL LOCATOR SYSTEM FOR MULTIPLE PROXIMITY DETECTION; U.S. Pat. No. 7,969,419, issued Jun. 28, 2011, entitled PRE-AMPLIFIER AND MIXER CIRCUITRY FOR A LOCATOR ANTENNA; U.S. patent application Ser. No. 13/189,844, filed Jul. 25, 2011, entitled BURIED OBJECT LOCATOR SYSTEMS AND METHODS; U.S. Pat. No. 7,990,151, issued Aug. 2, 2011, entitled TRI-POD BURIED LOCATOR SYSTEM; U.S. Pat. No. 8,013,610, issued Sep. 6, 2011, entitled HIGH Q SELF-TUNING LOCATING TRANSMITTER; U.S. Pat. No. 8,035,390, issued Oct. 11, 2011, entitled OMNIDIRECTIONAL SONDE AND LINE LOCATOR; U.S. patent application Ser. No. 13/346,668, Jan. 9, 2012, entitled PORTABLE CAMERA CONTROLLER PLATFORM FOR USE WITH PIPE INSPECTION SYSTEM; U.S. Pat. No. 8,106,660, issued Jan. 31, 2012, entitled SONDE ARRAY FOR USE WITH BURIED LINE LOCATOR; U.S. Pat. No. 8,203,343, issued Jun. 19, 2012, entitled RECONFIGURABLE PORTABLE LOCATOR EMPLOYING MULTIPLE SENSOR ARRAYS HAVING FLEXIBLE NESTED ORTHOGONAL ANTENNAS; U.S. patent application Ser. No. 13/584,799, filed Aug. 13, 2012, entitled BURIED OBJECT LOCATOR SYSTEMS AND METHODS; U.S. Pat. No. 8,248,056, issued Aug. 21, 2012, entitled A BURIED OBJECT LOCATOR SYSTEM EMPLOYING AUTOMATED VIRTUAL DEPTH EVENT DETECTION AND SIGNALING; U.S. Pat. No. 8,264,226, issued Sep. 11, 2012, entitled SYSTEMS AND METHODS FOR LOCATING BURIED PIPES AND CABLES WITH A MAN PORTABLE LOCATOR AND A TRANSMITTER IN A MESH NETWORK; U.S. patent application Ser. No. 13/647,310, filed Oct. 8, 2012, entitled PIPE INSPECTION SYSTEM APPARATUS AND METHODS; U.S. Pat. No. 8,289,385, issued Oct. 16, 2012, entitled PUSH-CABLE FOR PIPE INSPECTION SYSTEM; U.S. patent application Ser. No. 13/769,202, Feb. 15, 2013, entitled SMART PAINT STICK DEVICES AND METHODS; U.S. patent application Ser. No. 13/774,351, Feb. 22, 2013, entitled DOCKABLE TRIPODAL CAMERA CONTROL UNIT; U.S. patent application Ser. No. 13/787,711, Mar. 6, 2013, entitled DUAL SENSED LOCATING SYSTEMS AND METHODS; U.S. patent application Ser. No. 13/793,168, filed Mar. 11, 2013, entitled BURIED OBJECT LOCATORS WITH CONDUCTIVE ANTENNA BOBBINS; U.S. Pat. No. 8,395,661, issued Mar. 12, 2013, entitled PIPE INSPECTION SYSTEM WITH SELECTIVE IMAGE CAPTURE; U.S. patent application Ser. No. 13/826,112, Mar. 14, 2013, entitled SYSTEMS AND METHODS INVOLVING A SMART CABLE STORAGE DRUM AND NETWORK NODE FOR TRANSMISSION OF DATA; U.S. Pat. No. 8,400,154, issued Mar. 19, 2013, entitled LOCATOR ANTENNA WITH CONDUCTIVE BOBBIN; U.S. patent application Ser. No. 13/851,951, Mar. 27, 2013, entitled DUAL ANTENNA SYSTEMS WITH VARIABLE POLARIZATION; U.S. patent application Ser. No. 13/894,038, May 14, 2013, entitled OMNI-INDUCER TRANSMITTING DEVICES AND METHODS; U.S. patent application Ser. No. 13/925,636, Jun. 24, 2013, entitled MODULAR BATTERY PACK APPARATUS, SYSTEMS, AND METHODS INCLUDING VIRAL DATA AND/OR CODE TRANSFER; U.S. patent application Ser. No. 14/027,027, Sep. 13, 2013, entitled SONDE DEVICES INCLUDING A SECTIONAL FERRITE CORE STRUCTURE; U.S. Pat. No. 8,547,428, issued Oct. 1, 2013, entitled PIPE MAPPING SYSTEM; U.S. Pat. No. 8,564,295, issued Oct. 22, 2013, entitled METHOD FOR SIMULTANEOUSLY DETERMINING A PLURALITY OF DIFFERENT LOCATIONS OF THE BURIED OBJECTS AND SIMULTANEOUSLY INDICATING THE DIFFERENT LOCATIONS TO A USER; U.S. patent application Ser. No. 14/033,349, filed Sep. 20, 2013, entitled PIPE INSPECTION WITH SNAP ON PIPE GUIDES; U.S. Pat. No. 8,540,429, issued Sep. 24, 2013, entitled SNAP ON PIPE GUIDE; U.S. patent application Ser. No. 14/077,022, filed Nov. 11, 2013, entitled WEARABLE MAGNETIC FIELD UTILITY LOCATOR SYSTEM WITH SOUND FIELD GENERATION; U.S. Pat. No. 8,587,648, issued Nov. 19, 2013, entitled SELF-LEVELING CAMERA HEAD; U.S. patent application Ser. No. 14/136,104, Dec. 20, 2013, entitled ROTATING CONTACT ASSEMBLIES FOR SELF-LEVELING CAMERA HEADS; U.S. patent application Ser. No. 14/148,649, Jan. 6, 2014, entitled MAPPING LOCATING SYSTEMS AND METHODS; U.S. Pat. No. 8,635,043, issued Jan. 21, 2014, entitled LOCATOR AND TRANSMITTER CALIBRATION SYSTEM; U.S. patent application Ser. No. 14/203,485, filed Mar. 10, 2014, entitled PIPE INSPECTION CABLE COUNTER AND OVERLAY MANAGEMENT SYSTEM; U.S. patent application Ser. No. 14/207,527, Mar. 12, 2014, entitled ROTATING CONTACT ASSEMBLIES FOR SELF-LEVELING CAMERA HEADS; U.S. patent application Ser. No. 14/207,502, Mar. 12, 2014, entitled GRADIENT ANTENNA COILS FOR USE IN LOCATING SYSTEMS; U.S. patent application Ser. No. 14/214,151, Mar. 14, 2014, entitled DUAL ANTENNA SYSTEMS WITH VARIABLE POLARIZATION; U.S. patent application Ser. No. 14/216,358, Mar. 17, 2014, entitled SMART CABLE STORAGE DRUM AND NETWORK NODE SYSTEM AND METHODS; U.S. Pat. No. 8,717,028, issued May 6, 2014, entitled SPRING CLIPS FOR USE WITH LOCATING TRANSMITTERS; U.S. Pat. No. 8,773,133, issued Jul. 8, 2014, entitled ADAPTIVE MULTI-CHANNEL LOCATOR SYSTEM FOR MULTIPLE PROXIMITY DETECTION; U.S. Pat. No. 9,703,002, issued Jul. 13, 2014, entitled UTILITY LOCATOR SYSTEMS AND METHODS; U.S. patent application Ser. No. 14/446,145, Jul. 29, 2014, entitled UTILITY LOCATING SYSTEMS WITH MOBILE BASE STATION; U.S. Pat. No. 8,841,912, issued Sep. 23, 2014, entitled PRE-AMPLIFIER AND MIXER CIRCUITRY FOR A LOCATOR ANTENNA; U.S. patent application Ser. No. 14/935,878, Nov. 7, 2014, entitled INSPECTION CAMERA DEVICES AND METHODS WITH SELECTIVELY ILLUMINATED MULTISENSOR IMAGING; U.S. patent application Ser. No. 14/557,163, Dec. 1, 2014, entitled ASSYMETRIC DRAG FORCE BEARING; U.S. Pat. No. 8,908,027, issued Dec. 9, 2014, entitled ASYMMETRIC DRAG FORCE BEARING FOR USE WITH PUSH-CABLE STORAGE DRUM; U.S. Pat. No. 8,970,211, issued Mar. 3, 2015, entitled PIPE INSPECTION CABLE COUNTER NAD OVERLAY MANAGEMENT SYSTEM; U.S. patent application Ser. No. 14/642,596, filed Mar. 9, 2015, entitled PIPE CLEARING CABLES AND APPARATUS; U.S. Pat. No. 8,984,698, issued Mar. 24, 2015, entitled LIGHT WEIGHT SEWER CABLE; U.S. patent application Ser. No. 14/709,301, filed May 11, 2015, entitled PIPE MAPPING SYSTEMS AND METHODS; U.S. Pat. No. 9,041,794, issued May 26, 2015, entitled PIPE MAPPING SYSTEMS AND METHODS; U.S. Pat. No. 9,057,754, issued Jun. 16, 2015, entitled ECONOMICAL MAGNETIC LOCATOR APPARATUS AND METHOD; U.S. patent application Ser. No. 14/746,590, Jun. 22, 2015, entitled THERMAL EXTRACTION ARCHITECTURES FOR CAMERA AND LIGHTING DEVICES; U.S. Pat. No. 9,066,446, issued Jun. 23, 2015, entitled THERMAL EXTRACTION ARCHITECTURE FOR CAMERA HEADS, INSPECTION SYSTEMS, AND OTHER DEVICES AND SYSTEMS; U.S. patent application Ser. No. 14/749,545, Jun. 24, 2015, entitled ADJUSTABLE VARIABLE RESOLUTION INSPECTION SYSTEMS AND METHODS; U.S. patent application Ser. No. 14/797,760, Jul. 13, 2015, entitled HAPTIC DIRECTIONAL FEEDBACK HANDLES FOR LOCATING DEVICES; U.S. patent application Ser. No. 14/798,177, filed Jul. 13, 2015, entitled MARKING PAINT APPLICATOR FOR USE WITH PORTABLE UTILITY LOCATOR; U.S. Pat. No. 9,081,109, issued Jul. 14, 2015, entitled GROUND-TRACKING DEVICES FOR USE WITH A MAPPING LOCATOR; U.S. Pat. No. 9,082,269, issued Jul. 14, 2015, entitled HAPTIC DIRECTIONAL FEEDBACK HANDLES FOR LOCATION DEVICES; U.S. Pat. No. 9,080,992, issued Jul. 14, 2015, entitled ADJUSTABLE VARIABLE RESOLUTION INSPECTION SYSTEMS AND METHODS; U.S. patent application Ser. No. 14/800,490, Jul. 15, 2013, entitled UTILITY LOCATOR DEVICES, SYSTEMS, AND METHODS WITH SATELLITE AND MAGNETIC FIELD SONDE ANTENNA SYSTEMS; U.S. Pat. No. 9,085,007, issued Jul. 21, 2015, entitled MARKING PAINT APPLICATOR FOR PORTABLE LOCATOR; U.S. Pat. No. 9,134,255, issued Sep. 15, 2015, entitled PIPE INSPECTION SYSTEM WITH SELECTIVE IMAGE CAPTURE; U.S. patent application Ser. No. 14/949,868, Nov. 23, 2015, entitled BURIED OBJECT LOCATORS WITH DODECAHEDRAL ANTENNA NODES; U.S. Pat. No. 9,207,350, issued Dec. 8, 2015, entitled BURIED OBJECT LOCATOR APPARATUS WITH SAFETY LIGHTING ARRAY; U.S. patent application Ser. No. 14/970,362, Dec. 15, 2015, entitled COAXIAL VIDEO PUSH-CABLES FOR USE IN INSPECTION SYSTEMS; U.S. Pat. No. 9,222,809, issued Dec. 29, 2015, entitled PORTABLE PIPE INSPECTION SYSTEMS AND APPARATUS; U.S. patent application Ser. No. 15/006,119, Jan. 26, 2016, entitled SELF-STANDING MULTI-LEG ATTACHMENT DEVICES FOR USE WITH UTILITY LOCATORS; U.S. patent application Ser. No. 15/434,056, Feb. 16, 2016, entitled BURIED UTILITY MARKER DEVICES, SYSTEMS, AND METHODS; U.S. patent application Ser. No. 15/050,267, filed Feb. 22, 2016, entitled SELF-LEVELING CAMERA HEAD; U.S. Pat. No. 9,277,105, issued Mar. 1, 2016, entitled SELF-LEVELING CAMERA HEAD; U.S. Pat. No. 9,341,740, issued May 17, 2016, entitled OPTICAL GROUND TRACKING APPARATUS, SYSTEMS, AND METHODS; U.S. patent application Ser. No. 15/187,785, Jun. 21, 2016, entitled BURIED UTILITY LOCATOR GROUND TRACKING APPARATUS, SYSTEMS, AND METHODS; U.S. Pat. No. 9,372,117, issued Jun. 21, 2016, entitled OPTICAL GROUND TRACKING APPARATUS, SYSTEMS, AND METHODS; U.S. patent application Ser. No. 15/225,623, Aug. 1, 2016, entitled SONDE-BASED GROUND-TRACKING APPARATUS AND METHODS; U.S. patent application Ser. No. 15/225,721, filed Aug. 1, 2016, entitled SONDES AND METHODS FOR USE WITH BURIED LINE LOCATOR SYSTEMS; U.S. Pat. No. 9,411,066, issued Aug. 9, 2016, entitled SONDES AND METHODS FOR USE WITH BURIED LINE LOCATOR SYSTEMS; U.S. Pat. No. 9,411,067, issued Aug. 9, 2016, entitled GROUND-TRACKING SYSTEMS AND APPARATUS; U.S. patent application Ser. No. 15/247,503, Aug. 25, 2016, entitled LOCATING DEVICES, SYSTEMS, AND METHODS USING FREQUENCY SUITES FOR UTILITY DETECTION; U.S. Pat. No. 9,927,546, issued Aug. 29, 2016, entitled PHASE SYNCHRONIZED BURIED OBJECT LOCATOR APPARATUS, SYSTEMS, AND METHODS; U.S. Pat. No. 9,435,907, issued Sep. 6, 2016, entitled PHASE SYNCHRONIZED BURIED OBJECT LOCATOR APPARATUS, SYSTEMS, AND METHODS; U.S. patent application Ser. No. 15/264,355, Sep. 13, 2016, entitled HIGH BANDWIDTH VIDEO PUSH-CABLES FOR PIPE INSPECTION SYSTEMS; U.S. Pat. No. 9,448,376, issued Sep. 20, 2016, entitled HIGH BANDWIDTH PUSH-CABLES FOR VIDEO PIPE INSPECTION SYSTEMS; U.S. Pat. No. 9,465,129, issued Oct. 11, 2016, entitled IMAGE-BASED MAPPING LOCATING SYSTEM; U.S. Pat. No. 9,468,954, issued Oct. 18, 2016, entitled PIPE INSPECTION SYSTEM WITH JETTER PUSH-CABLE; U.S. patent application Ser. No. 15/331,570, Oct. 21, 2016, entitled KEYED CURRENT SIGNAL UTILITY LOCATING SYSTEMS AND METHODS; U.S. Pat. No. 9,477,147, issued Oct. 25, 2016, entitled SPRING ASSEMBLIES WITH VARIABLE FLEXIBILITY FOR USE WITH PUSH-CABLES AND PIPE INSPECTION SYSTEMS;

U.S. patent application Ser. No. 15/339,766, Oct. 31, 2016, entitled GRADIENT ANTENNA COILS AND ARRAYS FOR USE IN LOCATING SYSTEMS; U.S. patent application Ser. No. 15/345,421, Nov. 7, 2016, entitled OMNI-INDUCER TRANSMITTING DEVICES AND METHODS; U.S. Pat. No. 9,488,747, issued Nov. 8, 2016, entitled GRADIENT ANTENNA COILS AND ARRAYS FOR USE IN LOCATING SYSTEM; U.S. Pat. No. 9,494,706, issued Nov. 15, 2016, entitled OMNI-INDUCER TRANSMITTING DEVICES AND METHODS; U.S. patent application Ser. No. 15/360,979, Nov. 23, 2016, entitled UTILITY LOCATING SYSTEMS, DEVICES, AND METHODS USING RADIO BROADCAST SIGNALS; U.S. patent application Ser. No. 15/369,693, Dec. 5, 2016, entitled CABLE STORAGE DRUM WITH MOVABLE CCU DOCKING APPARATUS; U.S. patent application Ser. No. 15/376,576, filed Dec. 12, 2016, entitled MAGNETIC SENSING BURIED OBJECT LOCATOR INCLUDING A CAMERA; U.S. Pat. No. 9,521,303, issued Dec. 13, 2016, entitled CABLE STORAGE DRUM WITH MOVEABLE CCU DOCKING APPARATUS; U.S. Pat. No. 9,523,788, issued Dec. 20, 2016, entitled MAGNETIC SENSING BURIED OBJECT LOCATOR INCLUDING A CAMERA; U.S. patent application Ser. No. 15/396,068, filed Dec. 30, 2016, entitled UTILITY LOCATOR TRANSMITTER APPARATUS AND METHODS; U.S. patent application Ser. No. 15/425,785, filed Feb. 6, 2017, entitled METHOD AND APPARATUS FOR HIGH-SPEED DATA TRANSFER EMPLOYING SELF-SYNCHRONIZING QUADRATURE AMPLITUDE MODULATION (QAM); U.S. Pat. No. 9,571,326, issued Feb. 14, 2017, entitled METHOD AND APPARATUS FOR HIGH-SPEED DATA TRANSFER EMPLOYING SELF-SYNCHRONIZING QUADRATURE AMPLITUDE MODULATION (QAM); U.S. patent application Ser. No. 15/457,149, Mar. 13, 2017, entitled USER INTERFACES FOR UTILITY LOCATORS; U.S. patent application Ser. No. 15/457,222, Mar. 13, 2017, entitled SYSTEMS AND METHODS FOR LOCATING BURIED OR HIDDEN OBJECTS USING SHEET CURRENT FLOW MODELS; U.S. patent application Ser. No. 15/457,897, Mar. 13, 2017, entitled UTILITY LOCATORS WITH RETRACTABLE SUPPORT STRUCTURES AND APPLICATIONS THEREOF; U.S. patent application Ser. No. 14/022,067, Mar. 21, 2017, entitled USER INTERFACES FOR UTILITY LOCATORS; U.S. Pat. No. 9,599,449, issued Mar. 21, 2017, entitled SYSTEMS AND METHODS FOR LOCATING BURIED OR HIDDEN OBJECTS USING SHEET CURRENT FLOW MODELS; U.S. patent application Ser. No. 15/470,642, Mar. 27, 2017, entitled UTILITY LOCATING APPARATUS AND SYSTEMS USING MULTIPLE ANTENNA COILS; U.S. patent application Ser. No. 15/470,713, Mar. 27, 2017, entitled UTILITY LOCATORS WITH PERSONAL COMMUNICATION DEVICE USER INTERFACES; U.S. patent application Ser. No. 15/483,924, Apr. 10, 2017, entitled SYSTEMS AND METHODS FOR DATA TRANSFER USING SELF-SYNCHRONIZING QUADRATURE AMPLITUDE MODULATION (QAM); U.S. patent application Ser. No. 15/485,082, Apr. 11, 2017, entitled MAGNETIC UTILITY LOCATOR DEVICES AND METHODS; U.S. patent application Ser. No. 15/485,125, Apr. 11, 2017, entitled INDUCTIVE CLAMP DEVICES, SYSTEMS, AND METHODS; U.S. Pat. No. 9,625,602, issued Apr. 18, 2017, entitled SMART PERSONAL COMMUNICATION DEVICES AS USER INTERFACES; U.S. patent application Ser. No. 15/497,040, Apr. 25, 2017, entitled SYSTEMS AND METHODS FOR LOCATING AND/OR MAPPING BURIED UTILITIES USING VEHICLE-MOUNTED LOCATING DEVICES; U.S. Pat. No. 9,632,199, issued Apr. 25, 2017, entitled INDUCTIVE CLAMP DEVICES, SYSTEMS, AND METHODS; U.S. Pat. No. 9,632,202, issued Apr. 25, 2017, entitled ECONOMICAL MAGNETIC LOCATOR APPARATUS AND METHOD; U.S. Pat. No. 9,634,878, issued Apr. 25, 2017, entitled SYSTEMS AND METHODS FOR DATA SYNCHRONIZING QUADRATURE AMPLITUDE MODULATION (QAM); U.S. Pat. No. 9,638,824, issued May 2, 2017, entitled QUAD-GRADIENT COILS FOR USE IN LOCATING SYSTEMS; U.S. patent application Ser. No. 15/590,964, May 9, 2017, entitled BORING INSPECTION SYSTEMS AND METHODS; U.S. Pat. No. 9,651,711, issued May 16, 2017, entitled HORIZONTAL BORING INSPECTION DEVICE AND METHODS; U.S. patent application Ser. No. 15/623,174, Jun. 14, 2017, entitled TRACKABLE DIPOLE DEVICES, METHODS, AND SYSTEMS FOR USE WITH MARKING PAINT STICKS; U.S. patent application Ser. No. 15/185,018, Jun. 17, 2016, entitled RESILIENTLY DEFORMABLE MAGNETIC FIELD TRANSMITTER CORES FOR USE WITH UTILITY LOCATING DEVICES AND SYSTEMS; U.S. patent application Ser. No. 15/626,399, Jun. 19, 2017, entitled SYSTEMS AND METHODS FOR UNIQUELY IDENTIFYING BURIED UTILITIES IN A MULTI-UTILITY ENVIRONMENT; U.S. Pat. No. 9,684,090, issued Jun. 20, 2017, entitled NULLED-SIGNAL LOCATING DEVICES, SYSTEMS, AND METHODS; U.S. Pat. No. 9,696,447, issued Jul. 4, 2017, entitled BURIED OBJECT METHODS AND APPARATUS USING MULTIPLE ELECTROMAGNETIC SIGNALS; U.S. Pat. No. 9,696,448, issued Jul. 4, 2017, entitled GROUND-TRACKING DEVICES FOR USE WITH A MAPPING LOCATOR; U.S. patent application Ser. No. 15/670,845, Aug. 7, 2017, entitled HIGH FREQUENCY AC-POWERED DRAIN CLEANING AND INSPECTION APPARATUS AND METHODS; U.S. patent application Ser. No. 15/681,250, Aug. 18, 2017, entitled ELECTRONIC MARKER DEVICES AND SYSTEMS; U.S. patent application Ser. No. 15/681,409, filed Aug. 20, 2017, entitled WIRELESS BURIED PIPE AND CABLE LOCATING SYSTEMS; U.S. Pat. No. 9,746,572, issued Aug. 29, 2017, entitled ELECTRONIC MARKER DEVICES AND SYSTEMS; U.S. Pat. No. 9,746,573, issued Aug. 29, 2017, entitled WIRELESS BURIED PIPE AND CABLE LOCATING SYSTEMS; U.S. patent application Ser. No. 15/701,247, Sep. 11, 2017, entitled PIPE INSPECTION SYSTEMS WITH SELF-GROUNDING PORTABLE CAMERA CONTROLLER; U.S. Pat. No. 9,769,366, issued Sep. 19, 2017, entitled SELF-GROUNDING TRANSMITTING PORTABLE CAMERA CONTROLLER FOR USE WITH PIPE INSPECTION SYSTEMS; U.S. Provisional Patent Application 62/564,215, Sep. 27, 2017, entitled MULTIFUNCTION BURIED UTILITY LOCATING CLIPS; U.S. patent application Ser. No. 15/728,250, Oct. 9, 2017, entitled OPTICAL GROUND TRACKING APPARATUS, SYSTEMS, AND METHODS FOR USE WITH BURIED UTILITY LOCATORS; U.S. patent application Ser. No. 15/728,410, Oct. 9, 2017, entitled PIPE INSPECTION SYSTEM WITH JETTER PUSH-CABLE; U.S. Pat. No. 9,784,837, issued Oct. 10, 2017, entitled OPTICAL GROUND TRACKING APPARATUS, SYSTEMS, AND METHODS; U.S. patent application Ser. No. 15/785,330, Oct. 16, 2017, entitled SYSTEMS AND METHODS OF USING A SONDE DEVICE WITH A SECTIONAL FERRITE CORE STRUCTURE; U.S. Pat. No. 9,791,382, issued Oct. 17, 2017, entitled PIPE INSPECTION SYSTEM WITH JET- TER PUSH-CABLE; U.S. Pat. No. 9,798,033, issued Oct. 24, 2017, entitled SONDE DEVICES INCLUDING A SECTIONAL FERRITE CORE; U.S. patent application Ser. No. 15/805,007, filed Nov. 6, 2017, entitled PIPE INSPECTION SYSTEM CAMERA HEADS; U.S. patent application Ser. No. 15/806,219, Nov. 7, 2017, entitled MULTI-CAMERA PIPE INSPECTION APPARATUS, SYSTEMS AND METHODS; U.S. Provisional Patent Application 62/580,386, Nov. 1, 2017, entitled THREE AXIS MEASUREMENT MODULES AND SENSING METHODS; U.S. patent application Ser. No. 15/811,264, Nov. 13, 2017, entitled SPRING ASSEMBLIES WITH VARIABLE FLEXIBILITY FOR USE WITH PUSH-CABLES AND PIPE INSPECTION SYSTEMS; U.S. patent application Ser. No. 15/811,361, Nov. 13, 2017, entitled OPTICAL GROUND TRACKING APPARATUS, SYSTEMS, AND METHODS; U.S. Pat. No. 9,824,433, issued Nov. 21, 2017, entitled PIPE INSPECTION SYSTEM CAMERA HEADS; U.S. Pat. No. 9,829,783, issued Nov. 28, 2017, entitled SPRING ASSEMBLIES WITH VARIABLE FLEXIBILITY FOR USE WITH PUSH-CABLES AND PIPE INSPECTION SYSTEMS; U.S. Pat. No. 9,835,564, issued Dec. 5, 2017, entitled MULTI-CAMERA PIPE INSPECTION APPARATUS, SYSTEMS, AND METHODS; U.S. Pat. No. 9,841,503, issued Dec. 12, 2017, entitled OPTICAL GROUND TRACKING APPARATUS, SYSTEMS, AND METHODS; U.S. patent application Ser. No. 15/846,102, Dec. 18, 2017, entitled SYSTEMS AND METHODS FOR ELECTRONICALLY MARKING, LOCATING, AND VIRTUALLY DISPLAYING BURIED UTILITIES; U.S. patent application Ser. No. 15/866,360, Jan. 9, 2018, entitled TRACKED DISTANCE MEASURING DEVICE, SYSTEMS, AND METHODS; U.S. patent application Ser. No. 15/870,787, Jan. 12, 2018, entitled MAGNETIC FIELD CANCELING AUDIO SPEAKERS FOR USE WITH BURIED UTILITY LOCATORS OR OTHER DEVICES; U.S. Provisional Patent Application 62/620,959, Jan. 23, 2018, entitled RECHARGEABLE BATTERY PACK ONBOARD CHARGE STATE INDICATION METHODS AND APPARATUS; U.S. Pat. No. 9,880,309, issued Jan. 30, 2018, entitled UTILITY LOCATOR TRANSMITTER APPARATUS AND METHODS; U.S. patent application Ser. No. 15/889,067, Feb. 5, 2018, entitled UTILITY LOCATOR TRANSMITTER DEVICES, SYSTEMS, AND METHODS WITH DOCKABLE APPARATUS; U.S. Pat. No. 9,891,337, issued Feb. 13, 2018, entitled UTILITY LOCATOR TRANSMITTER DEVICES, SYSTEMS, AND METHODS WITH DOCKABLE APPARATUS; U.S. patent application Ser. No. 15/919,077, Mar. 12, 2018, entitled PORTABLE PIPE INSPECTION SYSTEMS AND METHODS; U.S. Pat. No. 9,914,157, issued Mar. 13, 2018, entitled METHODS AND APPARATUS FOR CLEARING OBSTRUCTIONS WITH A JETTER PUSH-CABLE APPARATUS; U.S. patent application Ser. No. 15/922,703, Mar. 15, 2018, entitled SELF-LEVELING INSPECTION SYSTEMS AND METHODS; U.S. patent application Ser. No. 15/925,643, Mar. 19, 2018, entitled PHASE-SYNCHRONIZED BURIED OBJECT TRANSMITTER AND LOCATOR METHODS AND APPARATUS; U.S. patent application Ser. No. 15/925,671, Mar. 19, 2018, entitled MULTI-FREQUENCY LOCATING SYSTEMS AND METHODS; U.S. Pat. No. 9,924,139, issued Mar. 20, 2018, entitled PORTABLE PIPE INSPECTION SYSTEMS AND APPARATUS; U.S. patent application Ser. No. 15/936,250, Mar. 26, 2018, entitled GROUND TRACKING APPARATUS, SYSTEMS, AND METHODS; U.S. Pat. No. 9,927,368, issued Mar. 27, 2018, entitled SELF-LEVELING INSPECTION SYSTEMS AND METHODS; U.S. Pat. No. 9,927,545, issued Mar. 27, 2018, entitled MULTI-FREQUENCY LOCATING SYSTEM AND METHODS; U.S. Pat. No. 9,928,613, issued Mar. 27, 2018, entitled GROUND TRACKING APPARATUS, SYSTEMS, AND METHODS; U.S. Provisional Patent Application 62/656,259, Apr. 11, 2018, entitled GEOGRAPHIC MAP UPDATING METHODS AND SYSTEMS; U.S. patent application Ser. No. 15/954,486, filed Apr. 16, 2018, entitled UTILITY LOCATOR APPARATUS, SYSTEMS, AND METHODS; U.S. Pat. No. 9,945,976, issued Apr. 17, 2018, entitled UTILITY LOCATOR APPARATUS, SYSTEMS, AND METHODS; U.S. patent application Ser. No. 15/960,340, Apr. 23, 2018, entitled METHODS AND SYSTEMS FOR GENERATING INTERACTIVE MAPPING DISPLAYS IN CONJUNCTION WITH USER INTERFACE DEVICES; and U.S. Pat. No. 9,959,641, issued May 1, 2018, entitled METHODS AND SYSTEMS FOR SEAMLESS TRANSITIONING IN INTERACTIVE MAPPING SYSTEMS. The content of each of the above-described patents and applications is incorporated by reference herein in its entirety. The above-described patent applications and patents may be referred to herein collectively as the "incorporated applications."

The following exemplary embodiments are provided for the purpose of illustrating examples of various aspects, details, and functions of the present disclosure; however, the described embodiments are not intended to be in any way limiting. It will be apparent to one of ordinary skill in the art that various aspects may be implemented in other embodiments within the spirit and scope of the present disclosure.

It is noted that as used herein, the term, "exemplary" means "serving as an example, instance, or illustration." Any aspect, detail, function, implementation, and/or embodiment described herein as "exemplary" is not necessarily to be construed as preferred or advantageous over other aspects and/or embodiments.

Example Clip Devices Embodiments for Use in Utility Locating Systems

FIG. 1 illustrates one embodiment of a locating system 100 utilizing an exemplary clip device embodiment 110, connected to a target utility line 140, to couple current to the utility from a utility transmitter device 120 (also referred to herein as "transmitter device" or "transmitter") via cable 130. Cables of various embodiments, such as cable 130 as shown, may be a one wire cable or multi-wire cable or other cable configuration, such as a Litz wire cable.

Locating system 100 may also include one or more utility locator devices, such as locator device 150 carried by a user 160. A ground stake 170 may connect to the transmitter device 120 through an additional clip 110 and cable 130 and may be used to provide a grounding connection between Earth ground and the transmitter. Grounding is typically done when the transmitter 120 is used in a direct connect mode to complete a conductive circuit loop, wherein a direct physical connection is made to the utility or a coupled conductive element at the other terminal through a clip (or clips) such as clip 110. The transmitter device 120 generates and provides output current signals that may be continuous wave (CW) or modulated AC signals, to be coupled to utilities or other conductor(s), such as the utility line 140.

As illustrated in FIG. 1, these signals may be coupled directly to the utility line 140 through clip 110. A user 160 holding the locator 150 as shown (which is configured to measure emitted magnetic field signal(s) caused by current flow in the utility line 140) may then determine information associated with the buried utility line 140, such as depth, position, location, orientation, conductor current magnitude and/or phase or timing information, soil condition, presence of other utilities, and the like. Details of various locator and transmitter embodiments as may be used in the system of FIG. 1 are described in the incorporated applications. For example, the locator 150 may be a locator such as described in U.S. patent application Ser. No. 15/360,979, entitled UTILITY LOCATING SYSTEMS, DEVICES, AND METHODS USING RADIO BROADCAST SIGNALS, filed Nov. 23, 2016, and the transmitter device 120 may be a transmitter described in U.S. patent application Ser. No. 15/331,570, entitled KEYED CURRENT SIGNAL UTILITY LOCATING SYSTEMS AND METHODS, filed on Oct. 21, 2016. Or the locator and transmitter may be other devices as described in the incorporated applications or as are known or developed in the art.

Clip embodiment 110 may include one or more utility selector elements (details of which may be found in subsequent paragraphs and illustrations associated with FIGS. 6A-6F). A user, such as user 160, may select from a set of parameters on each utility selector element that may further be associated with the connected target utility line. For instance, the parameters may include a utility type (e.g., gas, water, electric, sewer, etc.) and/or other parameter identifiers (e.g., alphabetic or numeric identifiers or the like). This utility selector parameter data may further be communicated to the transmitter 120, locator device 150, and/or other system devices not illustrated and/or stored for use in post processing.

In some embodiments, communication of the utility selector parameter data and/or other system and device data may be provided to the transmitter device 120 for storage and/or wireless transmission to the locator device 150 via a wired, or preferably a wireless data link, such as link 180, including a wireless transmitter or transceiver module that may be included in the clip or coupled to the clip. In some embodiments additional communication links may be established with the clip devices 110, additional locators, additional transmitters, and/or other locate system elements, such as one or more remote servers, computer systems, and/or utility mapping systems. The link may be wired or wireless and may be established using a wireless data communications module in the locator, transmitter, clip, and/or other device or element. In some embodiments, a wired data link, such as that provided by cable 130, may be used to communicate data between system devices.

Data communicated between the various locate system devices (e.g., clip device embodiments, locators, transmitters, and/or other electronic computing devices or systems) may include, but is not limited to: utility type or other utility selector parameter data, information related to clip device(s) or transmitter or locator operation, phase or timing information of signals generated by or received at the clip device and/or the transmitter and/or locator, output signal power levels, received signal information provided from the locator, control signals from the locator to control the clip device(s) or transmitter operation or vice-versa, and/or other operational information from the clip device(s) or the transmitter(s) or locator(s). This data may be processed in one or more processing elements of the clip device and/or stored in a memory of the clip device and/or sent or received by the clip device via wired or wireless communication module(s).

For example, in some embodiments, the locator 150 may include a processing module with one or more processing elements to control via signaling, at least in part, one or more clip devices such as the clip devices 110 directly or through controlling the transmitter device 120, or both. A wireless link, such as data communication link 180, wired connection, such as cable 130, or a combination of the two may be used to provide communication links and/or device control functions between the various locate system devices. The clip devices 110 may include or be coupled to a corresponding processor module to effect control functions and/or send or receive associated data. For example, powering on/off, attached device control, and frequency selection controls for the clip 110 may be provided via the wireless link through the interface on the locator device 150. The wireless data communications module may, for example, be a Sonde beacon, Bluetooth, Wi-Fi, ZigBee, cellular, ISM, or other wireless data communications module or system as known or developed in the art.

The transmitter 120 and/or locator 150 and/or other system devices or elements may be equipped with global navigation system (GNS) modules or sensors, such as global positioning system (GPS) receiver modules, GLONASS system modules, Galileo system modules, as well as time synchronization receivers or modules, cellular or data communications modules, and/or other sensors or modules, such as inertial sensors, environmental condition sensors, and/or other data sensing or acquisition sensors or modules. Data from these navigation systems and/or inertial sensors, as well as other sensors and/or devices, may be communicated via wired and/or wireless link between the clip devices 110, the transmitter 120, locator device 150, and/or other system devices. GNS system modules may be used to generate precise time synchronization signaling to be used among the various locate system devices as described in, for example, incorporated U.S. patent application Ser. No. 14/214,151, entitled DUAL ANTENNA SYSTEMS WITH VARIABLE POLARIZATION, filed Mar. 14, 2014.

Turning to FIGS. 2A-2E, clip device embodiment 110 may include a base assembly 210 having a utility selector element 212, allowing utility type (e.g., gas, water, electric, sewer, etc.) or other parameters to be assigned to the target utility, and a handle section 214 allowing a user to grip and hold the clip 110. The base assembly 210 may further include a threaded cable terminal 216 allowing a cable, such as the cable 130 illustrated in FIG. 1, to secure thereto and establish an electrical connection for transmitting current generated from a transmitter, such as transmitter 120 illustrated in FIG. 1, and/or communicating data signal(s) between one or more clip devices 110 and transmitter 120.

Figure 4A:
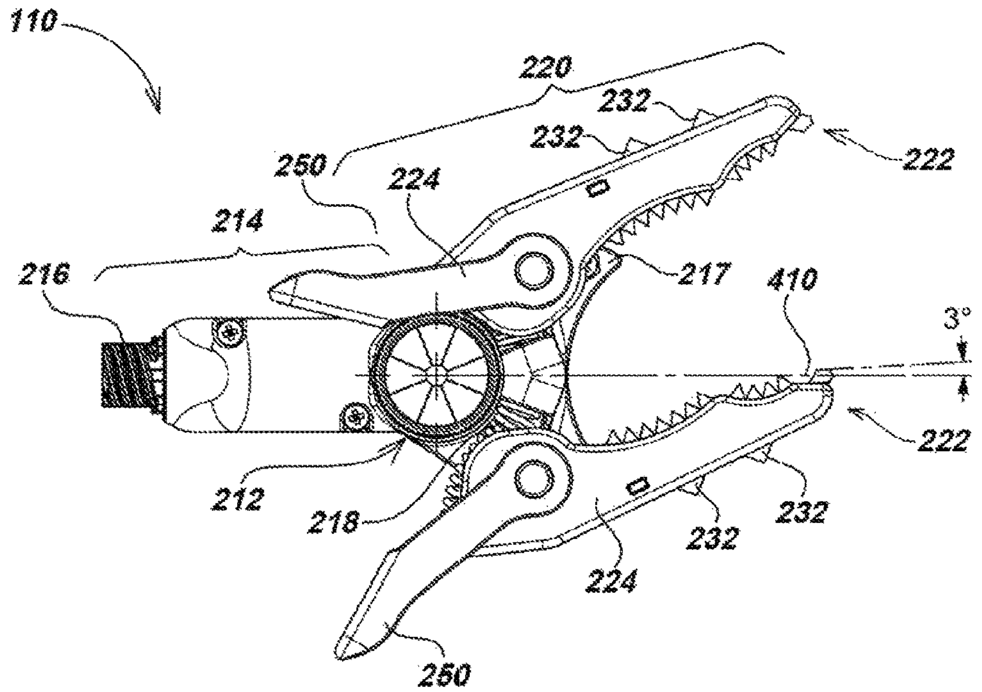
FIG. 4A is a side view of the clip embodiment of FIG. 1 illustrating details of the independently moveable double-acting jaw assembly.
Figure 4B:
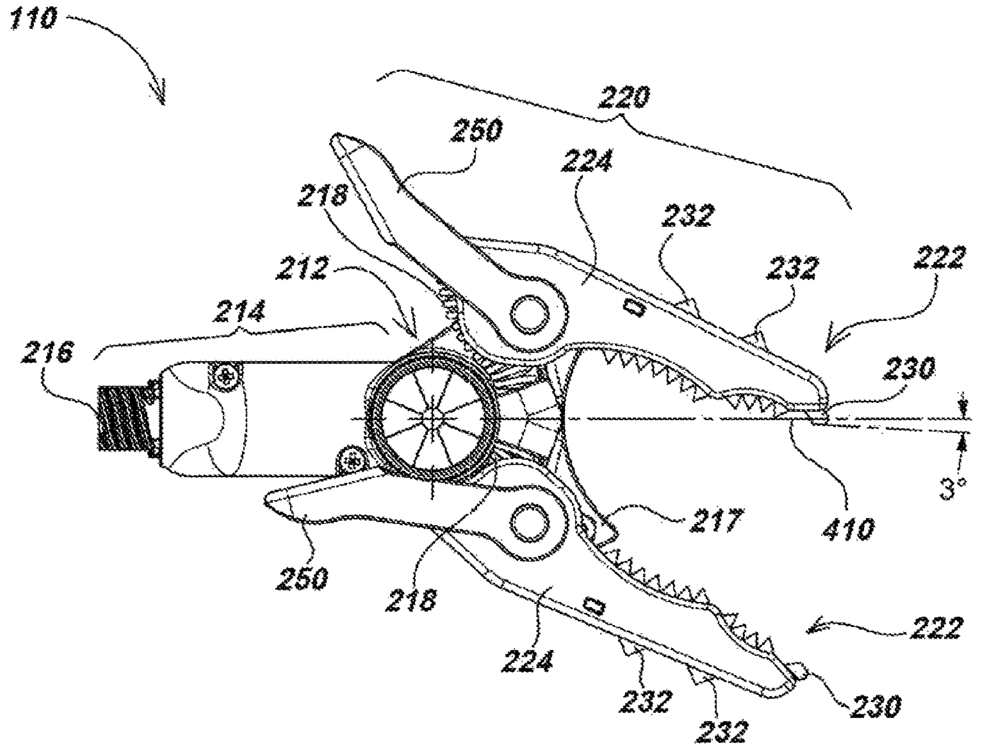
FIG. 4B is another side view of the clip embodiment of FIG. 1 illustrating the independently moveable double-acting jaw assembly.

The base assembly 210 may include a head portion 217 onto which a double-acting jaw assembly 220 may secure onto the base assembly 210 such that each individual jaw subassembly 222 may be independently movably opened as best illustrated in FIGS. 4A and 4B. For instance, either individual jaw subassembly 222 may be made to open independently of the other individual jaw subassembly 222, as best illustrated in FIGS. 4A and 4B, or both jaw subassemblies 222 may be opened simultaneously, as best illustrated FIGS. 2C and 2D.

Referring again to FIGS. 2A-2E, the head portion 217 may limit the travel of each individual jaw subassembly 222 as further described in subsequent paragraphs describing details of the embodiments shown in FIGS. 4A and 4B. A series of springs 218 (obscured in FIGS. 2C-2F and best illustrated in FIG. 2B) may be positioned between the base assembly 210 and each individual jaw subassembly of the double-acting jaw assembly 220. The springs 218 may provide a tension loaded closing force to close and hold closed the double-acting jaw assembly 220 which may be about a target utility.

Each individual jaw subassembly 222 may include a jaw base 224 with inward facing contoured regions such that each section may fit about target utilities of different utility line shapes or diameters. For instance, each individual jaw subassembly 222 may have a first contoured region 226 along the outmost section of each individual jaw subassembly 222 and a second contoured region 228 along the innermost section of each individual jaw subassembly 222, such that the first contoured region 226 is dimensioned and shaped to fit and grip securely onto the circumference of small diameter pipes or conduits (e.g., utility lines of an approximately 1 inch outer diameter), and a second countered region 228 may be dimensioned and shaped to fit and grip onto the circumference of medium diameter pipes or conduits (e.g., utility lines having an outer diameter between 1 and 2.5 inches).

It is noted that in use with large diameter utility lines (e.g., utility lines having an outer diameter between 2.5 and 6 inches or larger diameter lines), the double-acting jaw assembly 220 of clip device 110 may be configured to fully open and secure to a target utility line along the first contoured region 226 and/or a front serrated contact element 230. In such configurations, the magnetic attractive force from magnets 248 (FIGS. 2A-2E, and 2G) in each individual jaw subassembly 222 may assist in securing the clip device 110 to the target utility by magnetic attractive force.

With clip 110, the magnetic attractive force of magnets 248 (FIGS. 2A-2E, and 2G) within either individual jaw subassembly 222 may be selected to fully support the weight of clip device 110 and secure it to target utilities having an outer diameter measure of greater than 6 inches or which are otherwise shapes that do not fit within the double-acting jaw assembly 220. In such uses, the clip 110 may remain closed and secure to the target utility via the external surface of one individual jaw subassembly 222 only through the magnetic attractive force of magnets 248 (FIGS. 2A-2E, and 2G) therein.

In other embodiments, different contoured regions or segments, which may be dimensioned and shaped for different circumferences or range of circumferences and/or shapes of target utility lines, may be used. Each individual jaw subassembly 222 may have a front serrated conductive contact element 230 protruding in an angled bucktoothed fashion from the front opening of the individual jaw subassembly 222 and side serrated conductive contact elements 232 extending within the contoured regions and extending along the outer surface of each individual jaw subassembly 222.

It is noted that the side serrated conductive contact elements 232 may extend out through the external surface of each individual jaw subassembly 222, allowing the direct conductor to conductor contact to be established in use configurations wherein the target utility has an outer diameter measure of greater than about 6 inches, or is otherwise shaped such that the target utility does not fit within the double-acting jaw assembly 220 and the clip device must secure to the target utility via the external surface of one individual jaw subassembly 222. An additional contact region 234 is noted in the space between the front-most tooth of the side serrated conductive contact element 232 and the front serrated conductive contact element 230 on each individual jaw subassembly 222. This contact region 234 may be dimensioned to firmly grip and establish electrical contact with a ground stake such as the ground stake 170 of FIG. 1 or ground stake 910 of FIGS. 9A and 9B. The serrated conductive contact elements 230 and 232 may be used to penetrate conductive areas of the clips through paint, corrosion, dirt, and the like to establish a direct contact electrical connection with a target utility or other conductor, as well as to aid in frictionally gripping a target utility when the target utility fits within the double-acting jaw assembly 220.

In some embodiments, a clip may include one or more accessory ports for attaching accessory devices used to couple current signals onto one or more target utilities. These may be used to communicate data signals between the attachment accessory device(s) and clip device 110. For example, as best illustrated in FIGS. 2C and 2D, the clip embodiment 110 may include exterior accessory ports 240 along the outward facing surface of each jaw base 224 (obscured on the bottom jaw base 224 in FIGS. 2C and 2D) and interior accessory ports 244 along the inward facing surface of each jaw base 224 (obscured on the top jaw base 224 in FIGS. 2C and 2D). Various clip embodiments within the scope of the present disclosure may include one or more attachment accessories ports and attachment accessory devices for establishing an electrical connection or connections with one or more target utilities in various applications.

Figure 2A:
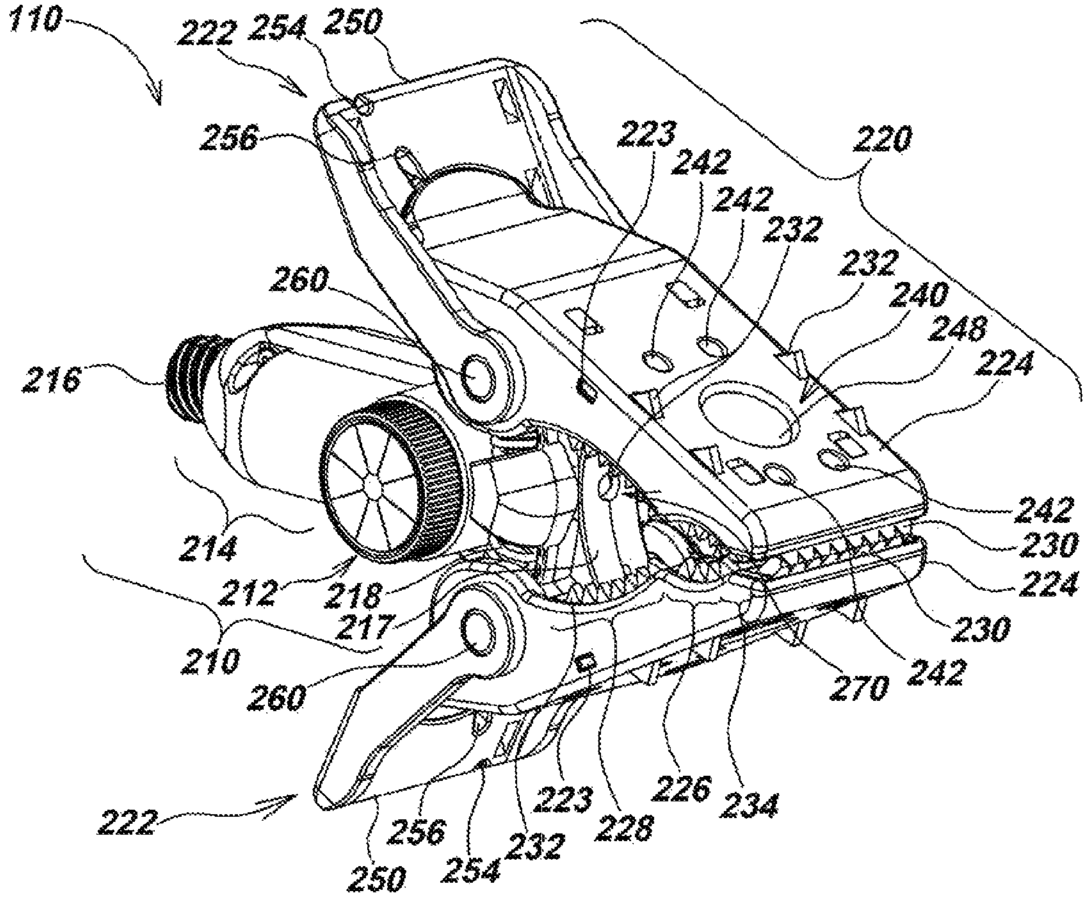
FIG. 2A is a detailed isometric view of the clip embodiment of FIG. 1.
Figure 2B:
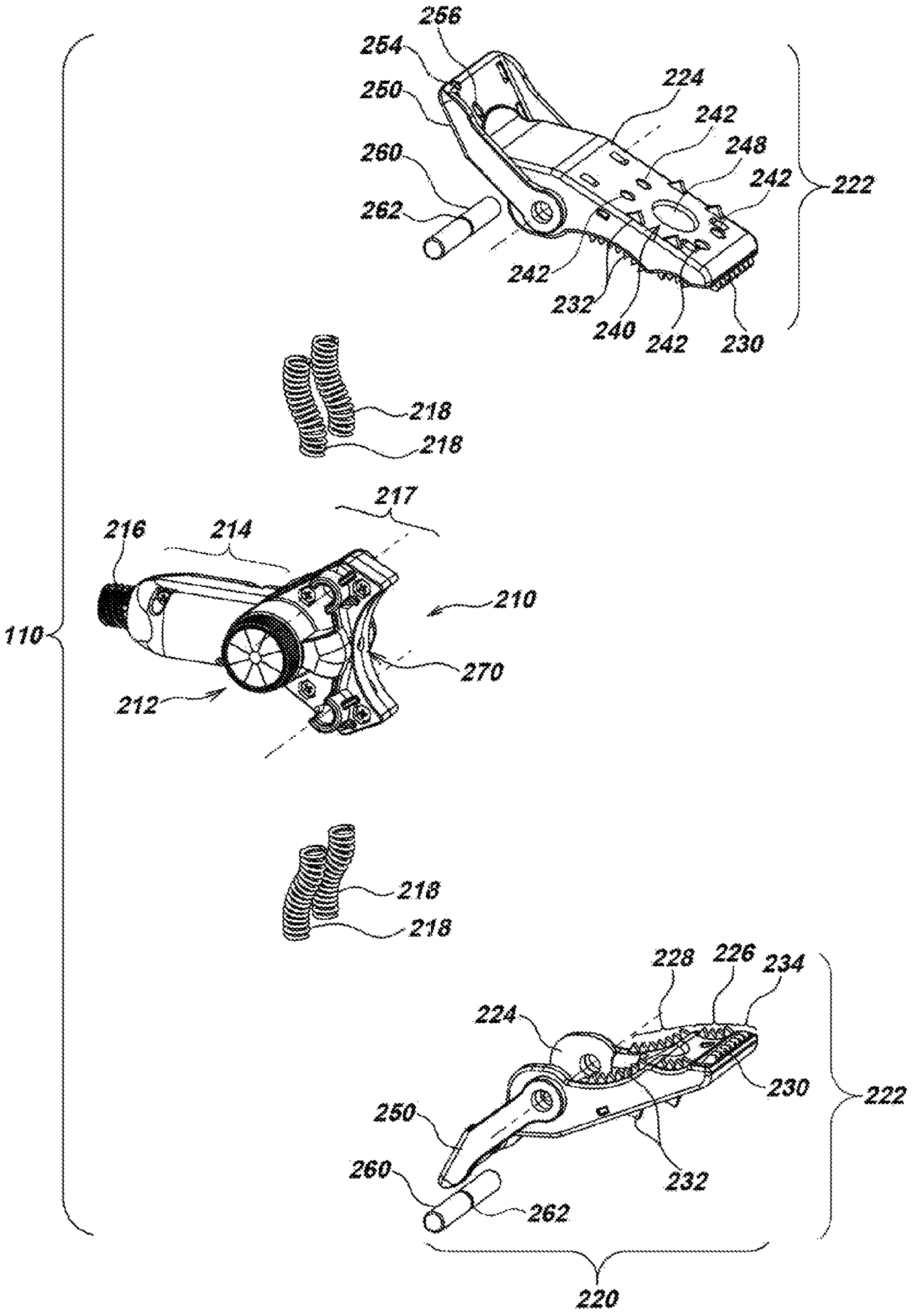
FIG. 2B is a partially exploded view of the clip embodiment of FIG. 1.
Figure 2C:
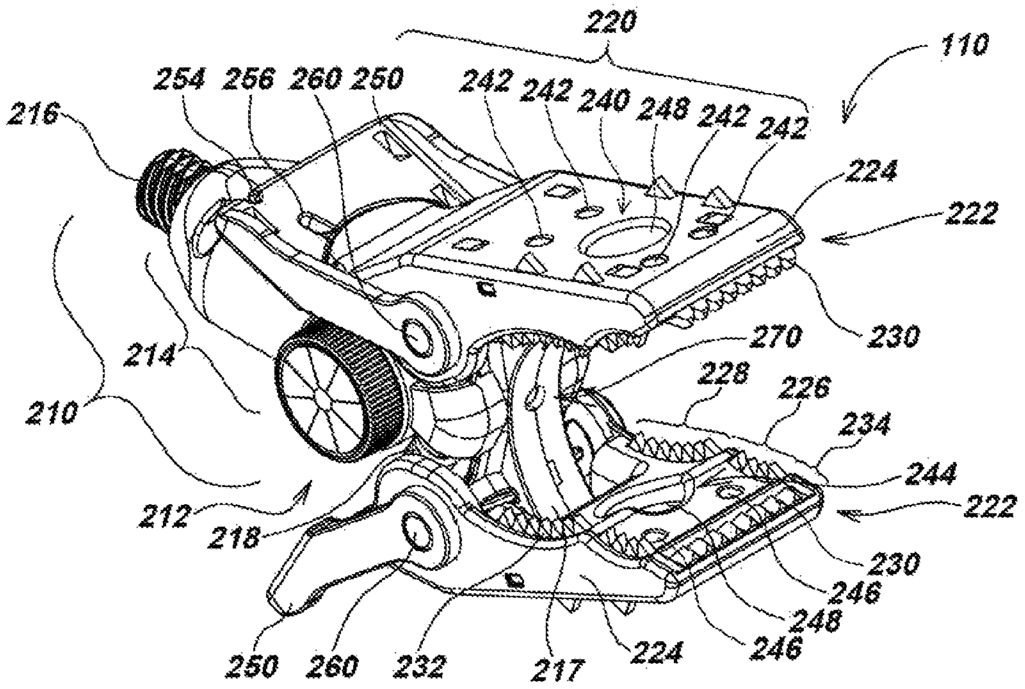
FIG. 2C is an isometric view of the clip embodiment of FIG. 1 with the jaw assembly partially open.
Figure 2D:
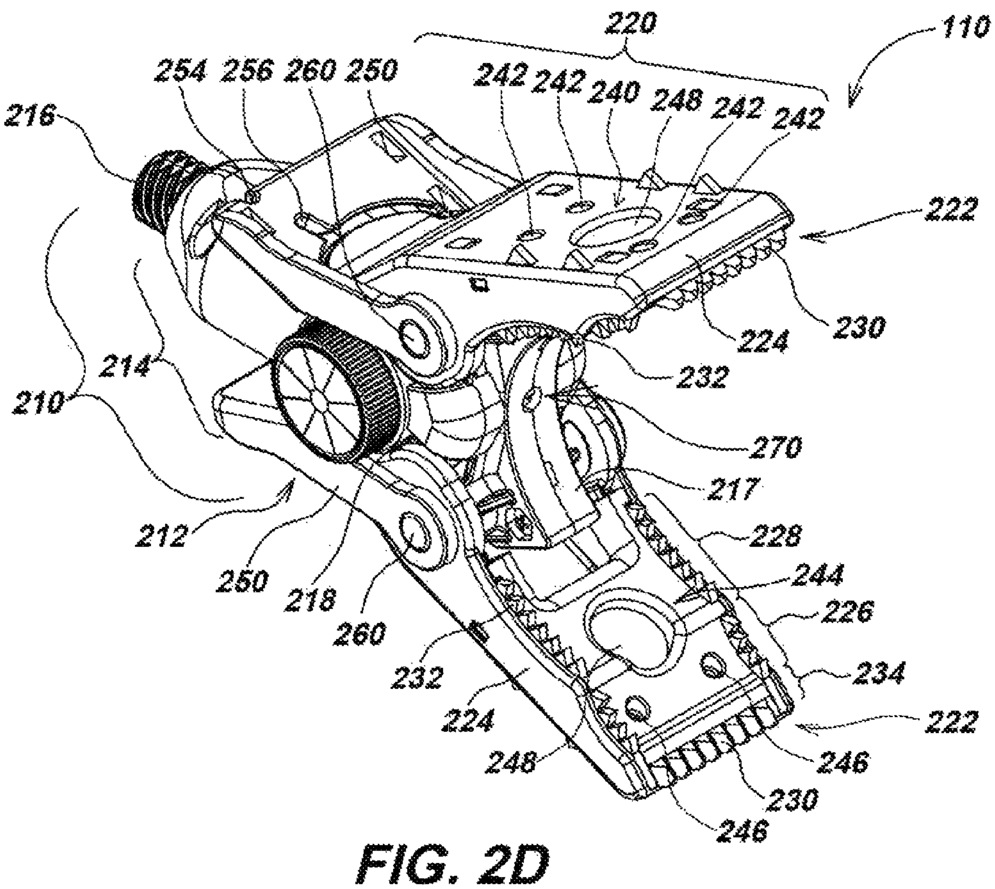
FIG. 2D is an isometric view of the clip embodiment of FIG. 1 with the jaw assembly fully open.
Figure 2E:
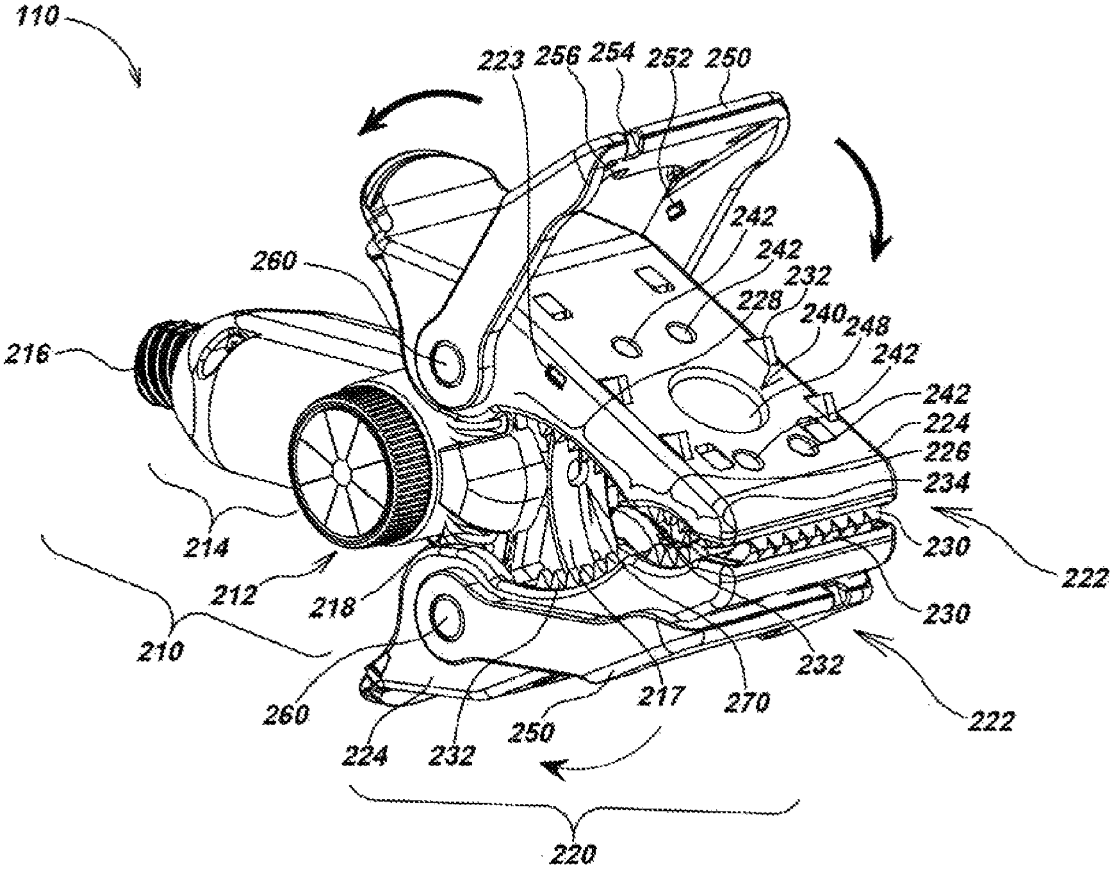
FIG. 2E is an isometric view of the clip embodiment of FIG. 1 illustrating opening and closing of the covers.

For example, as best illustrated in FIG. 2E, each individual jaw subassembly 222 may include a foldable cover 250 that can fold to cover the side serrated conductive contact elements 232 extending out along the outer surface of each individual jaw subassembly 222, or be folded out to reveal the side serrated conductive contact elements 232 extending out along the outer surface of each individual jaw subassembly 222 and provide additional mechanical leverage to a user in opening the double-acting jaw assembly 220 of clip device 110. When folded in to cover serrated conductive contact elements 232 extending out along the outer surface of each individual jaw subassembly 222, the cover 250 may lock into place through nubbins 252 on cover 250 mating with divots 223 formed along the side of each individual jaw subassembly 222. Notches 254 and 256 (shown in one of the folding covers 250 illustrated in FIG. 2E) may be formed along cover 250 that may secure string, rope, wire, or other cordage of an extension pole accessory as illustrated with the pull strings 1080 on extension pole accessory 1010 illustrated in FIG. 10B.

As best illustrated in FIG. 2B, a hinge pin 260 may secure the foldable cover 250 and each jaw base 224 to the base assembly 210. The hinge pin 260 may have a groove 262 formed about the circumference of the hinge pin 260 that, as described with FIG. 5A or 5B, may lock into place and secure the foldable cover 250 and each jaw base 224 to the base assembly 210 with a pin retainer 550 (FIG. 5A) disposed within the base assembly 210.

Figure 2F:
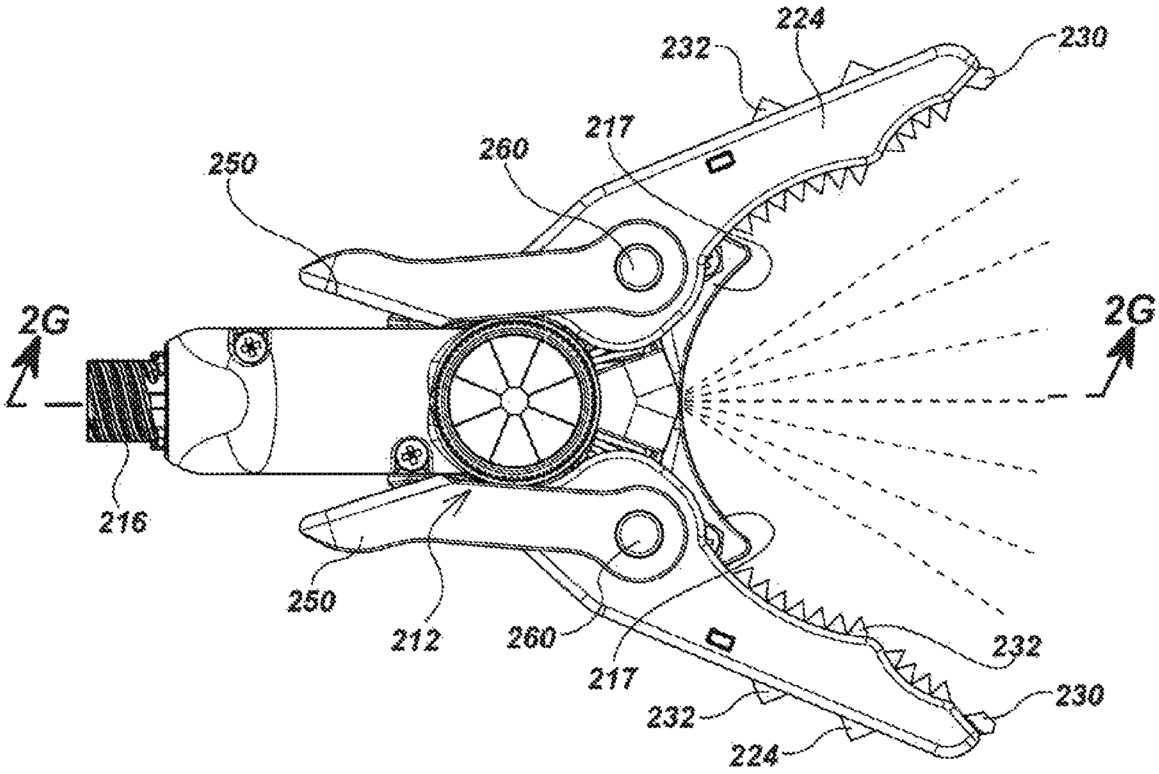
FIG. 2F is a side view of the clip embodiment of FIG. 1 with jaws open illustrating the illumination element.
Figure 2G:
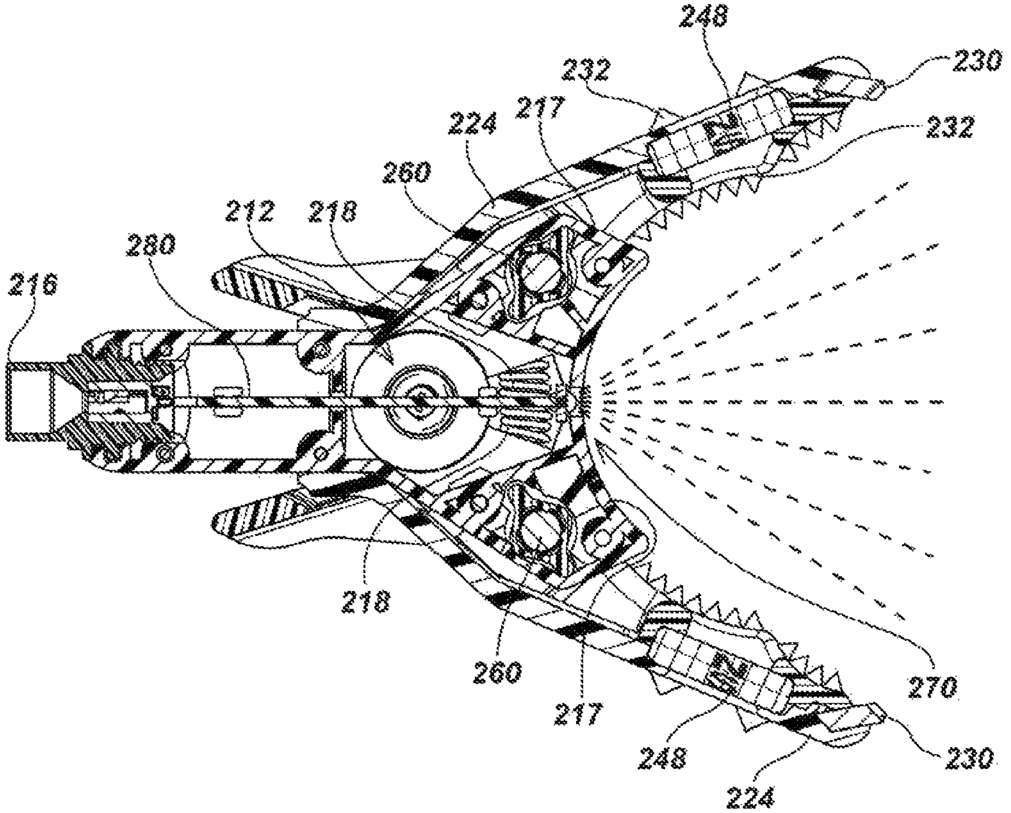
FIG. 2G is a section view of the clip embodiment of FIG. 2F along line 2G-2G.

As best illustrated in FIGS. 2F-2G, the clip embodiment 110 may include an illumination element that, upon actuation, may illuminate a work area. Such an illumination element may be or include an electric light generation device such as light emitting diode (LED) 270 (FIG. 2G) or other light emitting device. LED 270 (FIG. 2G) may secure to a PCB 280 (FIG. 2G) disposed within the cavity inside base assembly 210 allowing current signals and/or data signals to pass from PCB 280 (FIG. 2G) to LED 270 (FIG. 2G) when actuated. The LED 270 (FIG. 2G) may be turned on upon opening of the double-acting jaw assembly 220. For instance, when the double-acting jaw assembly 220 is fully closed, the front serrated conductive contact elements 230 on each individual jaw subassembly 222 may physically contact and create an electrical pathway. Likewise, when the clip device 110 is secured to a conductive utility line an electrical pathway is established. Upon opening the double-acting jaw assembly 220, the front serrated conductive contact elements 230 may physically disengage from one another, or various contact elements may otherwise disengage from the conductive utility line and break the electrical pathway. Breaking of this electrical contact may actuate the illumination of LED 270 (FIG. 2G). Likewise, the LED 270 (FIG. 2G) may be turned off upon closing of the double-acting jaw assembly 220 or otherwise restoring the electrical pathway between contact elements at each individual jaw subassembly 222 via corresponding switching circuits.

Figure 3:
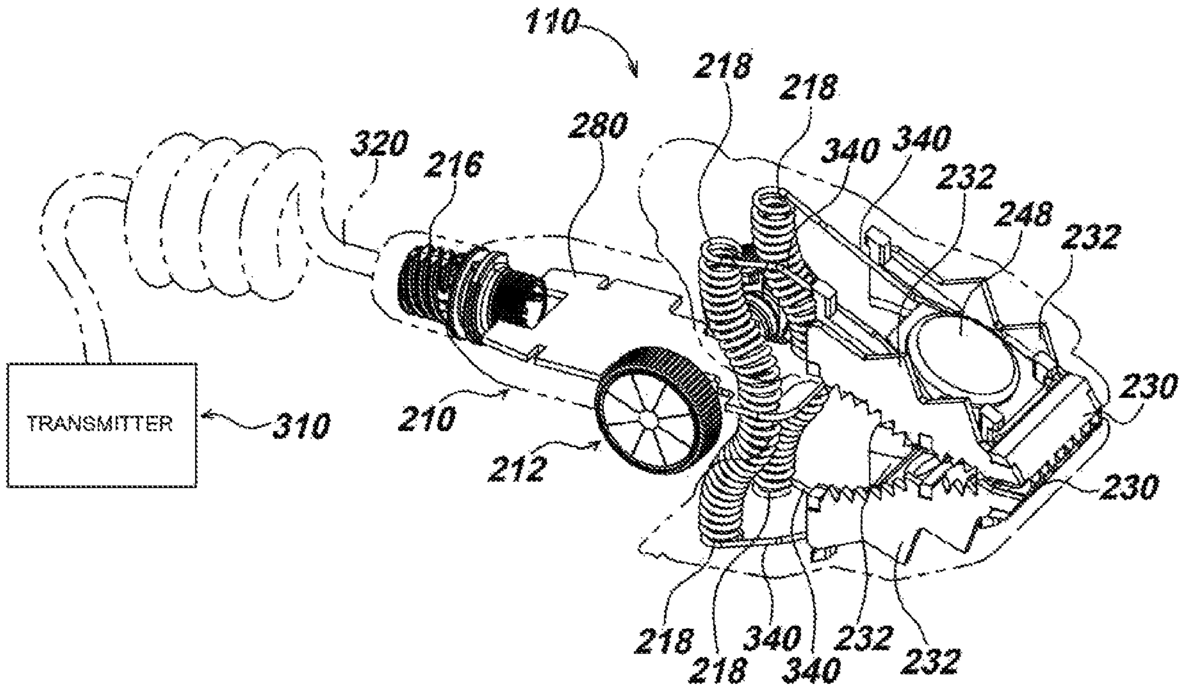
FIG. 3 is an illustration of various internal components of the clip embodiment of FIG. 1.

As illustrated in FIG. 3, current and/or data signals may be generated from a transmitter 310 and may be communicated with clip embodiment 110, such as via a cable 320 coupled to the cable terminal 216 on clip 110. From transmitter 310, the current and/or data signals may further be communicated to PCB 280 disposed within the base assembly 210 via cable terminal 216. The PCB of a clip embodiment in accordance with the present disclosure, such as PCB 280, may include electronic circuitry such as one or more processing elements used to receive, process, store and/or send the determined data and/or control operation of the clip device as well as various sensors.

Such sensors include but are not limited to magnetic sensors, global navigation systems (GNS) sensors/modules such as global position system (GPS) receiver modules, accelerometers, compass sensors, gyroscopic sensors, other inertial/position sensors, geophones, gas sensors, temperature sensors, environmental condition sensors, Sondes and/or other sensors or input devices. Such circuitry and sensors may include those associated with the powering and operation of the illumination element as well as those used with the one or more utility selector elements and communication of selected parameter or parameters thereof.

The communication of utility selector element parameters may be done using various methods and associated technologies for storing and sending signals. For instance, such parameters may be stored within memories within the clip device, transmitter, and/or one or more other system devices, and mapping of the utility line with associated utility selector element parameters may be done within post processing.

In other embodiments, such parameters may be communicated to various system devices in real-time or near real-time. For instance, utility selector element parameters may be communicated to a transmitter for further distribution of utility selector element parameter data as well as other system or device data to locator devices and/or other system device's wireless communication (e.g., Sonde beacon, Bluetooth, Wi-Fi, ZigBee, cellular, ISM, or other wireless data communications module or systems).

In some clip device embodiments, the clip device may include a wireless communication module (e.g., Sonde beacon, Bluetooth, Wi-Fi, ZigBee, cellular, ISM, or other wireless data communications module or systems) for distribution of utility selector element parameter data, control commands, and/or other system or device data. For instance, in some utility locating systems, such as that illustrated in FIG. 1, the clip device may include a Sonde beacon for generating, transmitting, and receiving communication signals with utility locator devices (e.g., locator device 150 of FIG. 1), transmitters also containing Sonde beacons (e.g., transmitter 310 or transmitter 120 of FIG. 1), and/or other system devices.

In some clip device embodiments, utility selector element parameter data may be encoded within current signals further transferred onto a connected utility line. For instance, amplitude shift keying (ASK), frequency shift keying (FSK), phase shift keying (PSK), or like signal modulation schemes may be used to encode the utility selector element parameter data onto the signal placed on a target utility further communicating such data to one or more locator devices measuring the signal from the same target utility line and further configured to decipher the encoded data.

Still referring to FIG. 3, the PCB 280 may include one or more magnetic sensors (not illustrated) which may measure the magnetic field of a magnet (e.g., magnet 640 of FIGS. 6A-6C) within each utility selector element 212 and determine position or orientation of each magnet 640 (FIGS. 6A-6C) which may further correspond to various parameters selectable by a user at the utility selector element 212. From PCB 280, the signal(s) (which may in some embodiments be modulated to encode utility selector parameter data) may be carried by springs 218 electrically and physically connected to PCB 280. The springs 218 may further communicate signal(s) with a set of jaw wires 340 and further with serrated conductive contact elements 230 and 232 and still further with a contacted utility line, such as utility line 140 of FIG. 1. The magnets 248 may further be electrically conductive and physically contact jaw wires 340 allowing signal(s) to be communicated via magnets 248 and further with any optionally connected attachment accessory devices (e.g., insulation punch attachment accessory 1140 of FIGS. 11B-11D or accessory clip device 1150 of FIGS. 11E-11F).

Turning to FIGS. 4A and 4B, each individual jaw subassembly 222 of the double-acting jaw assembly 220 may be independently movably opened and closed. In a closed position, each individual jaw subassembly 222 may be substantially travel limited to a neutral plane 410 (illustrated herein as a horizontal line for ease of demonstration) at which the jaws come together when closed. For instance, each individual jaw subassembly 222 may move to be closed until contacting and being stopped from further inward closing movement by the head portion 217 of base assembly 210. Clip device embodiments in accordance with the present disclosure may have travel limitations on each individual jaw subassembly. For example, the individual jaw subassemblies 222 may be travel limited beyond the neutral plane (e.g., neutral plane 410) allowing the double-acting jaw assembly, such as double-acting jaw assembly 220, to close and firmly hold closed. For instance, within the clip device embodiment 110 illustrated in FIGS. 4A and 4B, each individual jaw subassembly 222 may close about three degrees beyond the neutral plane 410.

Figure 4C:
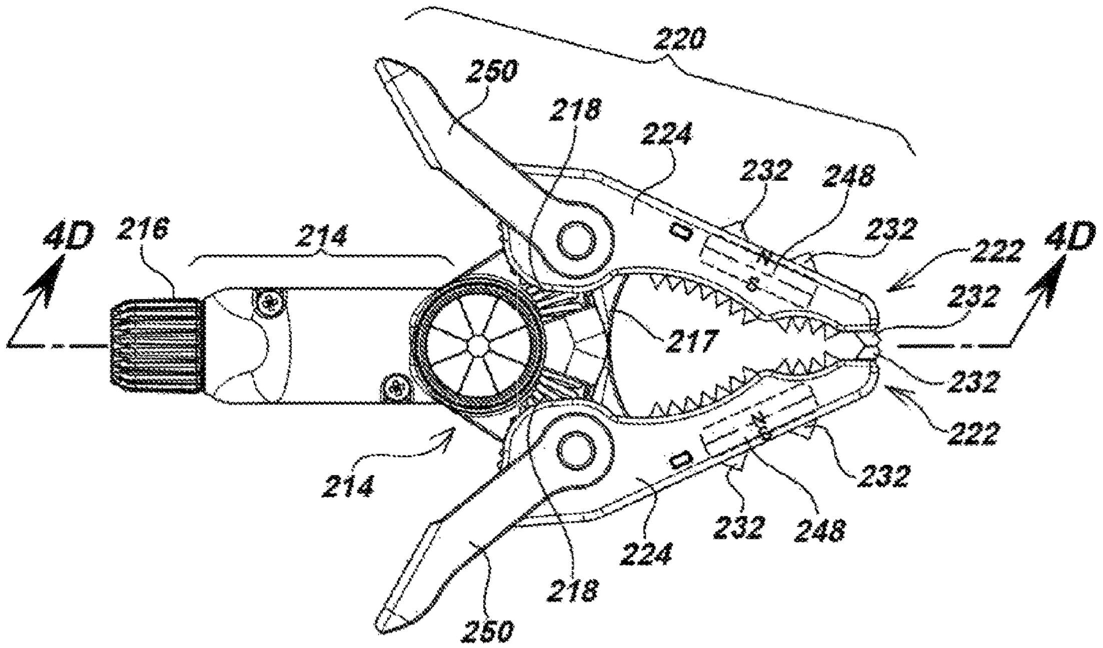
FIG. 4C is a side view of the clip embodiment of FIG. 1.
Figure 4D:
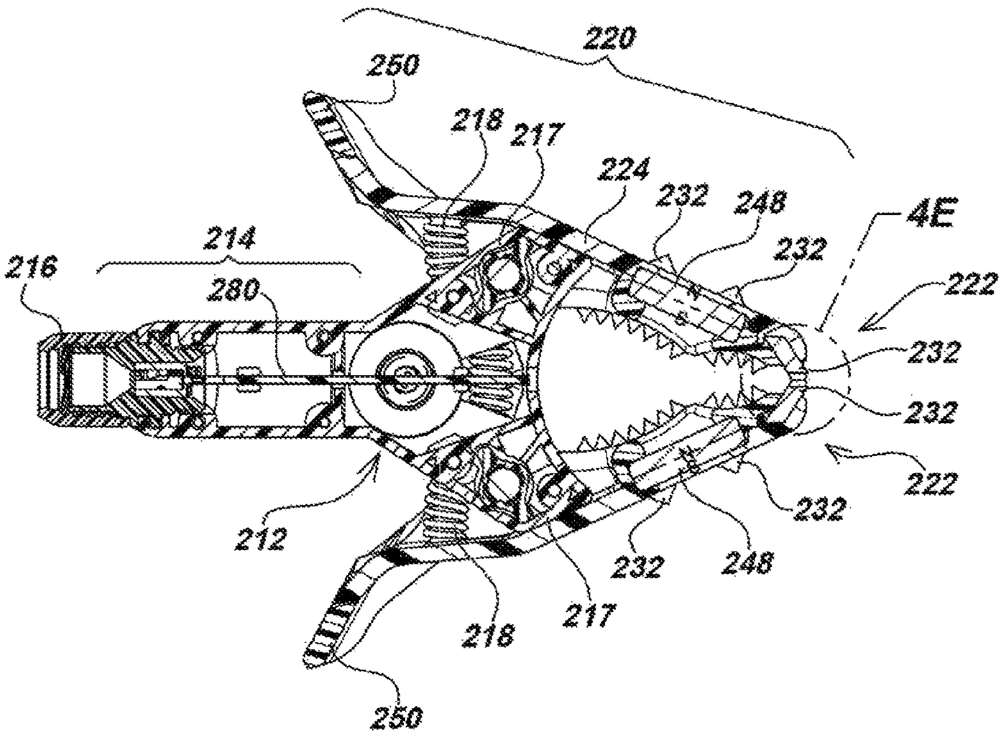
FIG. 4D is a section view of the clip embodiment of FIG. 4C along line 4D-4D.

As illustrated in FIGS. 4C and 4D, each magnet 248 within each individual jaw subassembly 222 may be oriented to magnetically attract to the magnet 248 within the other individual jaw subassembly 222, thereby assisting the double-acting jaw assembly 220 in firmly closing and/or grasping to a magnetically conductive target utility. As described in subsequent paragraphs and shown in corresponding drawing figures, the magnets 248 within each individual jaw subassembly 222 may, in some applications, be configured to support the weight of clip device 110 when coupled to a large diameter target utility (e.g., pipe 940 of FIGS. 9G-9H, pipe 946 of FIG. 9I, and pipe 950 of FIG. 9J).

Figure 4E:
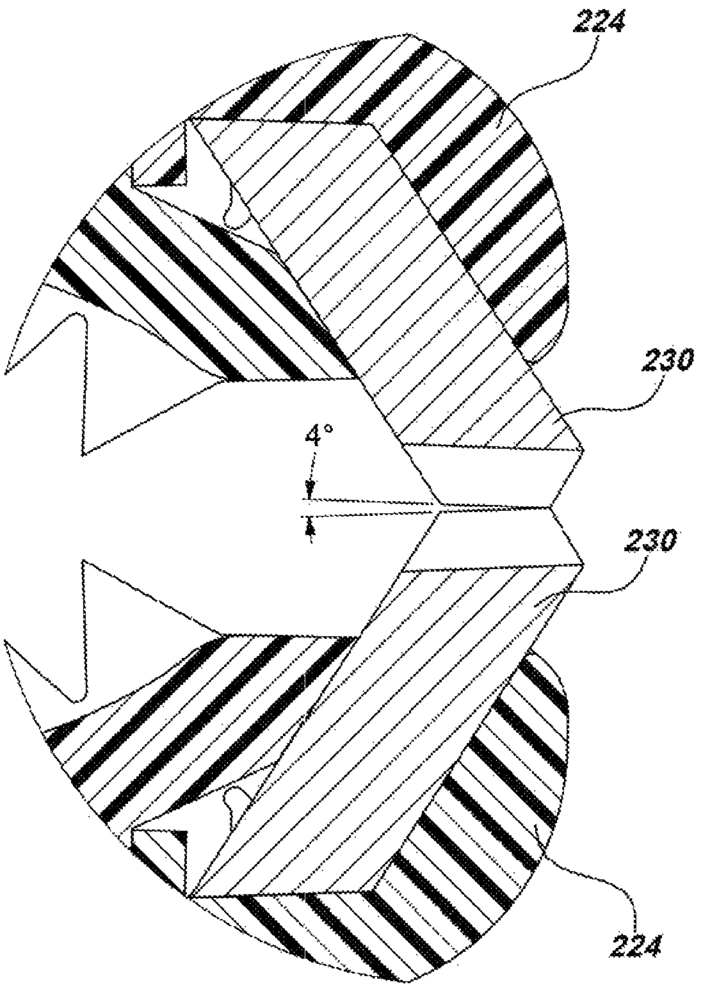
FIG. 4E is a detailed view of the front serrated conductive contact elements protruding outward in an angled buck-toothed fashion.

Referring to FIGS. 4D and 4E, the front serrated conductive contact element 230 on each individual jaw subassembly 222 may be oriented to protrude in an angled bucktoothed fashion and contact the other front serrated conductive contact element 230 on the other individual jaw subassembly 222 at an angle (e.g., at about a four degree angle as illustrated in FIG. 4E). The bucktoothed orientation of the front serrated conductive contact elements 230 allow the clip 110 to grip onto and establish an electrical direct contact with wires (as illustrated with wire 960 of FIG. 9K), screws or bolts, or other filaments or physically small target utilities.

Figure 5A:
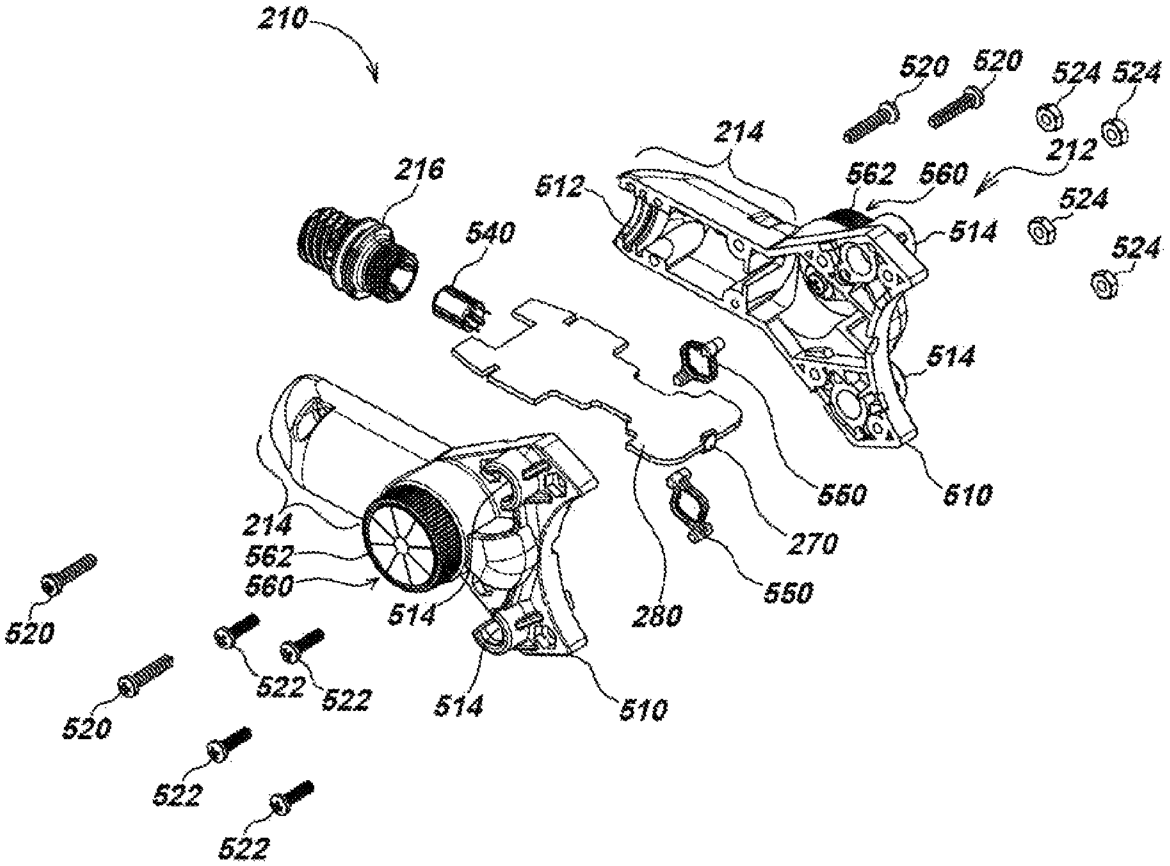
FIG. 5A is an exploded view of the base assembly embodiment.

Turning to FIG. 5A, the base assembly 210 may further include two base halves 510 that may, in assembly, be held together through a series of bolts 520 and 522 and nuts 524. Within base assembly 210, the PCB 280 may seat within a hollow cavity formed between the base halves 510. The PCB 280 may include sensors and circuitry for determining a user-selected utility type or other parameters through rotation of utility selector element 212 and generate data and communications regarding such parameters. The determined data may also be stored in a memory in the clip device and/or transmitted to other devices or elements of the locate system for storage, and/or to remote electronic computing devices or systems for storage and use in post processing. In some embodiments, a clip device in accordance with the present disclosure may include a wireless communication module for communicating data to various other system devices, such as associated locators, transmitters, cellular phones or tablets, portable computers, and the like.

As further illustrated in FIG. 5A, utility selector element 212 may include two utility selector subassemblies 560, such that one utility selector subassembly 560 may secure to each of the base halves 510. Each utility selector subassembly 560 may have a selector knob 562 which may independently rotate and offer various parameter selections to choose from on each utility selector subassembly 560. For example, the selectors may be configured such that the total parameter choices of the utility selector element 212 may be equal to the total parameters of one utility selector subassembly 560 multiplied by the total parameters on the other utility selector subassembly 560. In one example, a total of eight total parameter options on each utility selector subassembly 560 may result in sixty-four parameter options for the utility selector element. In some embodiments, the utility selector elements need not contain the same number of parameter selections. The utility selector element 212 may be further described in conjunction with FIGS. 6A-6F.

Still referring to FIG. 5A, the threaded cable terminal 216 may seat partially within and be secured thereto in assembly by a series of grooves 512 formed within the rear of both base halves 510. An electrical connection may be established between the threaded cable terminal 216 and PCB 280 via connector 540. The base assemblies 210 may each have hinge holes 514 formed through each of the base halves 510 that align in assembly. One individual jaw subassembly 222 may secure to the base assembly 210 at each aligned hinge hole 514 via a hinge pin 260 (FIGS. 2A-2E).

A pin retainer 550 may be secured between the base halves 510 at each aligned hinge hole 514. The pin retainer 550 may have an opening of slightly smaller diameter than each hinge pin 260 (FIGS. 2A-2E) but may flex as to allow a hinge pin 260 (FIGS. 2A-2E) to push through in assembly and hold the hinge pin 260 (FIGS. 2A-2E) in place. The hinge pin 260 (FIGS. 2A-2E) may push through aligning holes on the foldable cover 250 (FIGS. 2A-2E), each jaw base 224 (FIGS. 2A-2E), and hinge holes 514 until the pin retainer 550 may sit within the groove 262 (FIG. 2B) formed about the circumference of the hinge pin 260 (FIGS. 2A-2E) and secure in place such that the foldable cover 250 (FIGS. 2A-2E) and each jaw base 224 (FIGS. 2A-2E) may secure to the base assembly 210.

Figure 5B:
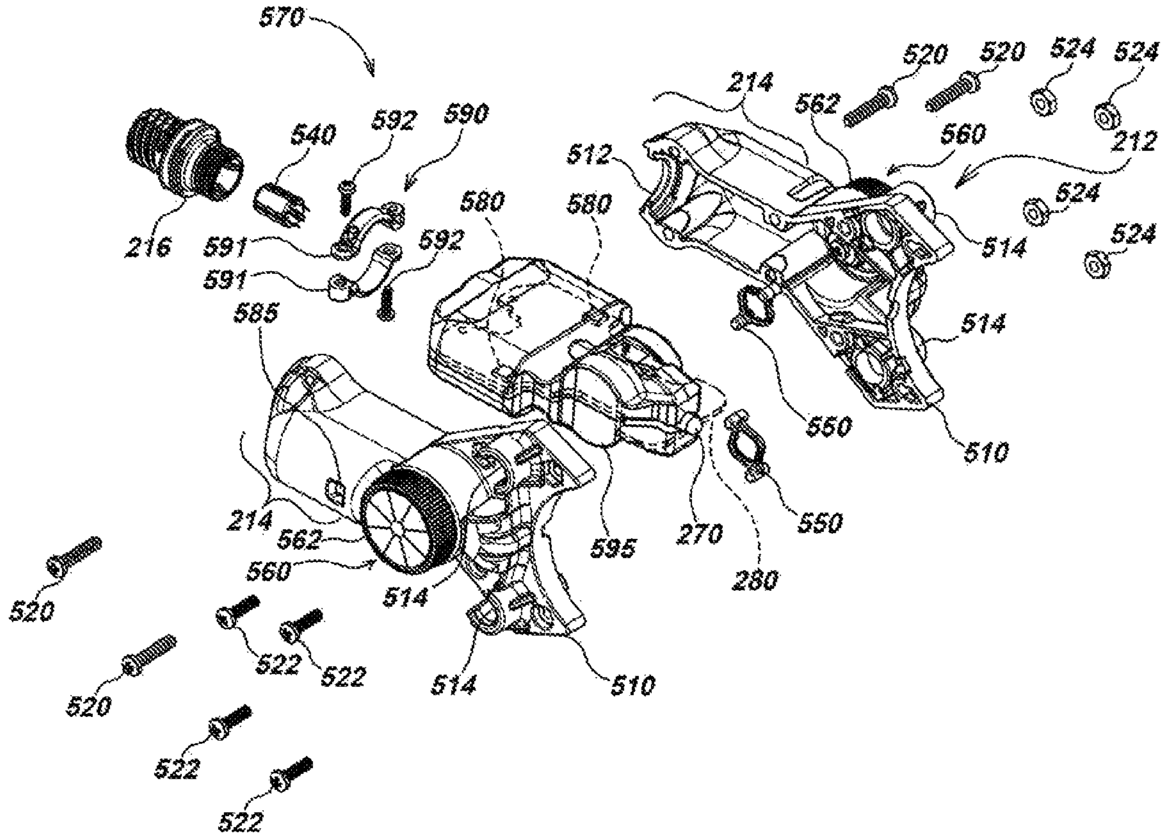
FIG. 5B is an exploded view of another base assembly embodiment.

Turning to FIG. 5B, an alternative base assembly 570 may share all aspects of the base assembly 210 illustrated in FIG. 5A with the addition of LEDs 580 on either side of PCB 280 aligning with indicator grooves 585 formed through each base half 510 near the selector knobs 562 that may further align to indicate a parameter on each selector knob 562. The indicator grooves 585 may allow light emitted by each LED 580 to be externally visible to a user. The LEDs 580 may be RGB LEDs such that they may emit different colors of lights. In such embodiments, a different color of light may be emitted that may be associated with each parameter selection on each selector knob 562. The LEDs 580 may further emit colors or flashes to indicate other information to a user (e.g., high voltage alerts, improper clip device placement alerts, other device health alerts, or the like). The base assembly 570 may include a retaining collar assembly 590 that may secure to PCB 280 and hold PCB 280 in place at the threaded cable terminal 216. The retaining collar assembly 590 may include two collar halves 591 each shaped with a semicircular groove. A collar half 591 may secure aligned on either face of the PCB 280 and secure thereto via screws 592 such that, in assembly, the retaining collar assembly 590 may have a circular opening that may tightly fight onto the end of threaded cable terminal 216 and secure thereto. The base assembly 570 may further include a ruggedized layer 595 partially surrounding and encapsulating the PCB 280, retaining collar assembly 590, and connector 540, further secured to threaded cable terminal 216 to protect the electronics therein against the ingress of water and/or other damaging elements. The ruggedized layer 595 may, in some embodiments, be a clear or partially translucent low pressure molded material allowing the passage of light from LEDs 580 on PCB 280 while protecting the various electronic components disposed on PCB 280. In further embodiments, the PCB 280 may be fully encapsulated by a ruggedized layer which may be of various materials and using various over mold or other like techniques to provide a waterproof and ruggedized layer of protection.

Figure 6A:
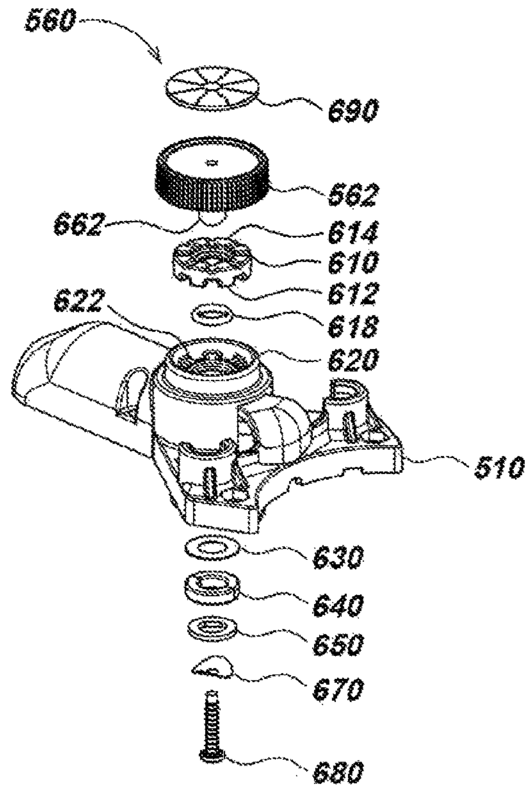
FIG. 6A is a top down isometric exploded view of a utility selector subassembly embodiment.
Figure 6B:
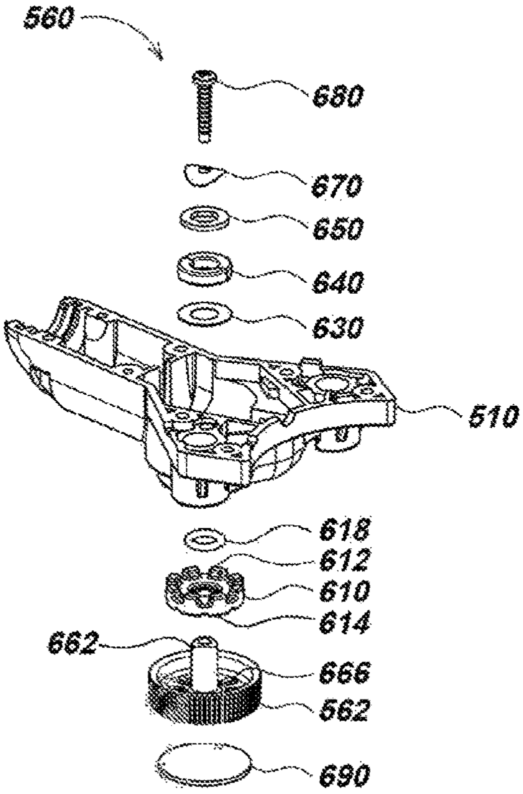
FIG. 6B is a bottom up isometric exploded view of a utility selector subassembly embodiment.
Figure 6C:
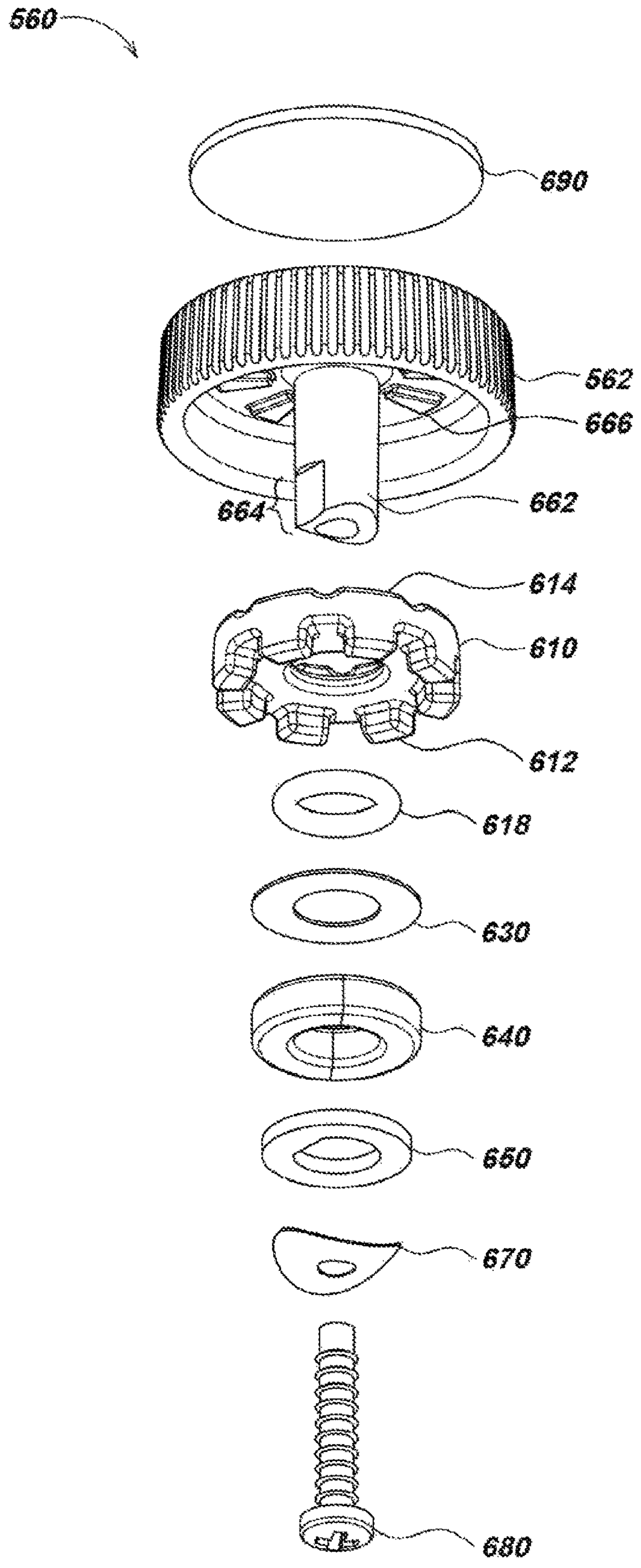
FIG. 6C is a detailed exploded view of a utility selector subassembly embodiment.
Figure 6D:
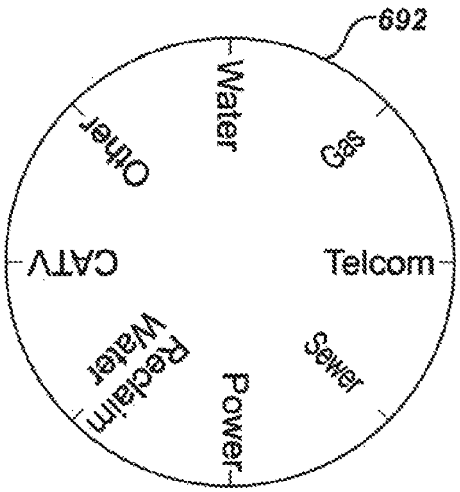
FIG. 6D is an illustration of an exemplary utility selector label embodiment.
Figure 6E:
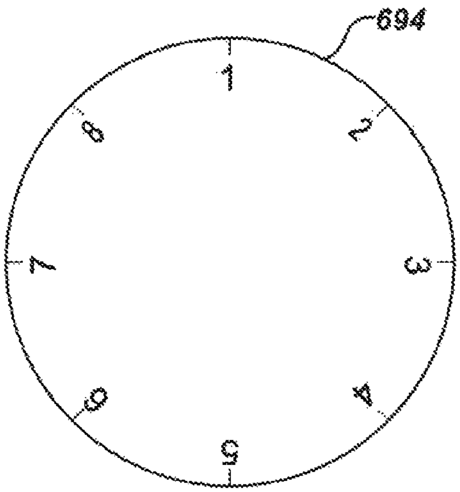
FIG. 6E is an illustration of another exemplary utility selector label embodiment.
Figure 6F:
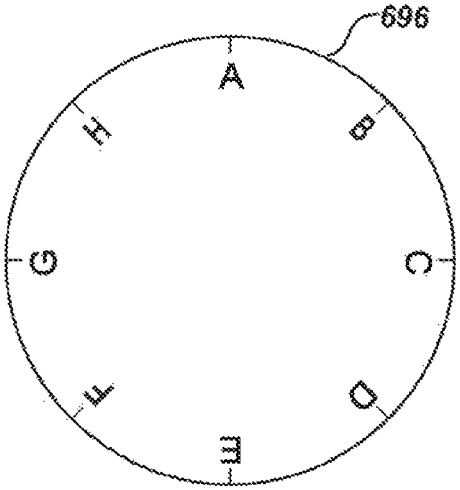
FIG. 6F is an illustration of another exemplary utility selector label embodiment.

Turning to FIGS. 6A and 6B, in each utility selector subassembly 560, a notched annular position selector 610 may seat within a knob retaining feature 620 on the outer surface of each base half 510 and key thereto against rotations. This keying may be implemented through a series of notches 612 formed along the surface of the position selector 610 that may mate with grooves 622 (FIG. 6A) formed within the knob retaining feature 620 on each base half 510. An o-ring 618 may seat within the knob retaining feature 620 between the position selector 610 and each base half 510 to prevent the ingress of water or debris. In assembly, a stem feature 662 on the selector knob 562 may extend through the position selector 610, o-ring 618, and the knob retaining feature 620 on each base half 510, and further through to seat a washer 630, an annular magnet 640, an annular magnet keying component 650, and a spring washer 670 contained within the cavity within the base assembly 210 (FIG. 5A) or, alternatively, such cavity in the base assembly 570 (FIG. 5B).

A screw 680 may mate into threads (not illustrated) formed within the end of the stem feature 662 on selector knob 562 and retain the spring washer 670, further retaining the magnet keying component 650, magnet 640, washer 630, o-ring 618, and position selector 610 together onto the stem feature 662 on selector knob 562 and further securing utility selector subassembly 560 to a base half 510. It is noted that magnet keying component 650 may be adhered to the magnet 640 and, in assembly, may key to a keying feature 664 (FIG. 6C) on the stem feature 662 of the selector knob 562 such that rotations of the selector knob 562 may result in rotations of the magnet keying component 650 and thereby the magnet 640.

As the selector knob 562 is set to the various parameter choice positions, such as those indicated on a label 690 or similar indicator of available parameter selections, the magnetic field of magnet 640 may be measured by one or more magnetic sensors (not illustrated) on PCB 280 (FIG. 3), and the measured magnetic field associated with various magnet 640 positions may be assigned to the corresponding parameters. Exemplary parameters that may be included on a label or other indicator are illustrated with parameters 692, 694, and 696 of FIGS. 6D, FIG. 6E, and FIG. 6F, respectively.

In other embodiments, other parameters and/or indications of the parameter choices may be used and reflected on the label accordingly. The selection of such parameters may be used to uniquely identify each connected utility at the locator device (e.g., locator device 150 of FIG. 1). For instance, each connected utility may have a utility type parameter (e.g., water, gas, electric, telecommunication, or other as illustrated with parameters 692 of FIG. 6D) and/or other parameters (e.g., numbers as illustrated with parameters 694 of FIG. 6E or letters as illustrated with parameters 696 of FIG. 6F or the like), which may be communicated to various other system devices (e.g., utility locating devices, transmitters, other clips or clamps, inductive stick devices, base stations, utility mapping systems and/or other computing devices). This information may be communicated in real-time, near real-time, stored for post processing, or a combination thereof.

Still referring to FIGS. 6A and 6B, within the utility selector subassembly 560, the selector knob 562 may be configured to click into place and hold at a selected parameter. Holding at a selected parameter may be implemented using a series of notches 666 formed within the selector knob 562 that may fit within grooves 614 on the outward facing surface of the position selector 610. The utility selector subassembly embodiment 560 has a total of eight notches 666 and eight grooves 614 corresponding to eight possible parameter choices, however other numbers may be used in alternate embodiments. As the notches 666 fit within the grooves 614, the spring washer 670 may provide a tension force holding the selector knob 562 and magnet 640 still in position indicating the selection of a parameter. The tension of spring washer 670 may be overcome by a rotational force imparted by a user turning the selector knob 562 thereby selecting a new parameter. In other utility selector element embodiments, different numbers and types of parameters may be used in a clip device in keeping with the present disclosure.

It is noted that the magnetic field of each magnet 640 may be set such that the position of each selector knob 562 and associated magnet 640 may be determinable at the one or more magnetic sensors on PCB 280 (as shown in FIG. 3) such that parameters may be selected at each utility selector subassembly 560 (e.g., eight parameter choices at each utility selector subassembly 560 resulting in eight times eight or sixty-four possible combined parameter choices). For instance, the magnet 640 in either utility selector subassembly 560 (as shown in FIG. 5A or 5B) may be diametrically magnetized and spaced apart from the other magnet 640 to the extent that the measured magnetic field at a magnetic sensor position or positions between the magnets 640 may be able to distinctly measure each parameter choice position and change in position on each utility selector subassembly 560 (FIG. 5A or 5B). In other embodiments, one or both of the utility selector elements may have a different number of parameter choices resulting in a different number of total parameter choices.

Figure 7A:
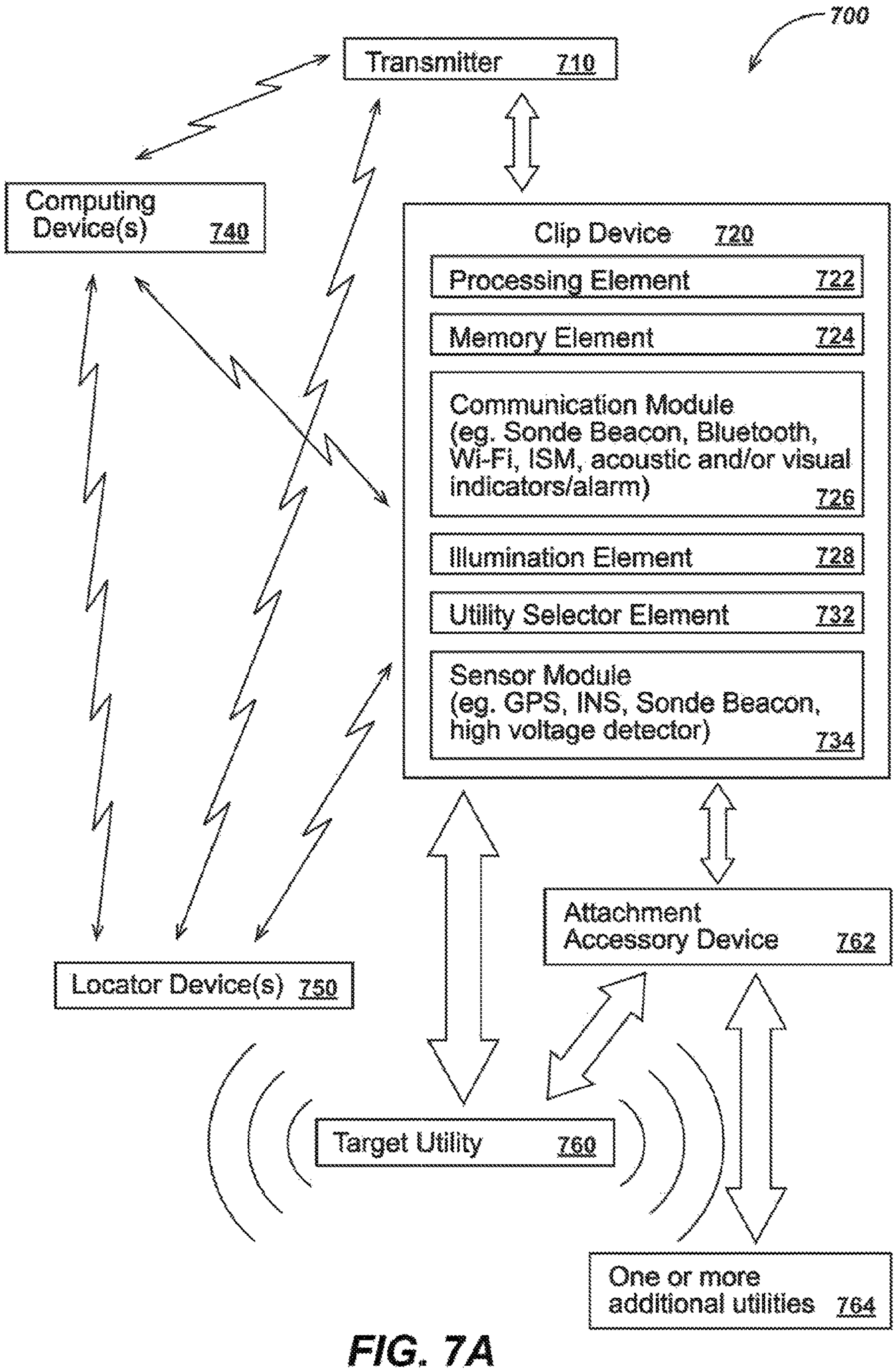
FIG. 7A is a diagram of a utility locating system using a clip embodiment.
Figure 7B:
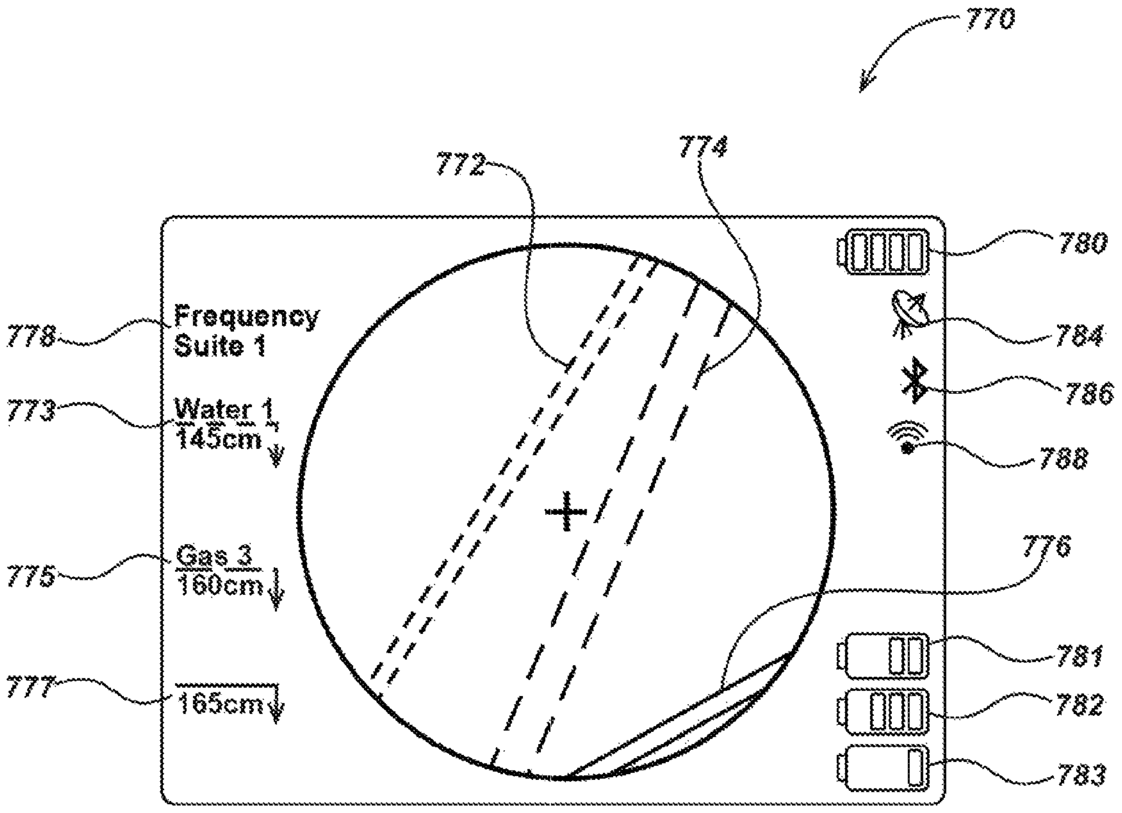
FIG. 7B is an exemplary user interface for a locating device using data provided by a utility selector element embodiment.

As illustrated in the locating system embodiment 700 of FIG. 7A, current and/or data signals may be generated from a transmitter 710 and communicated to a clip embodiment 720, which may be or share aspects with the clip device 110 previously described in FIGS. 1-3 or other clip devices described herein. For example, clip 720 may include a processing element 722 which may include or be a device or apparatus with a processing element to implement programmable steps and/or other functions associated with processing data signals from transmitter 710 and/or other system devices and/or other instructions or input, typically in the form of coded or interpreted software instructions. For instance, processing element 722 may be a general purpose processor, a digital signal processor (DSP), an application specific integrated circuit (ASIC), a field programmable gate array (FPGA) or other programmable logic device, discrete gate or transistor logic, discrete hardware components, memory elements, or any combination(s) thereof designed to control various device functions, such as those described herein.

The clip embodiment 720 may include one or more non-transitory memory storage elements 724, which may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The memory element(s) 724 may store device data such as geospatial location of the clip, parameter choice at one or more utility selector elements, or system, device, control commands or related data such as that data associated with mapping utility lines for transfer and post processing to one or more other system devices (e.g., computing device(s) 740 which may be or include personal computers, smart phones or tablets, servers and/or other computing systems for mapping utility lines as well as locator device(s) 750).

Likewise, such data may be communicated back to the transmitter 710 for storage and post processing/mapping of utility data. In some embodiments, such data may be communicated, in real-time or near real-time, to the computing device(s) 740 (e.g., tablet or notebook computers, servers, utility mapping devices) and/or locator device(s) 750 and/or other system devices. For instance, clip device 720 may optionally have a communication module 726 which may be or include a Sonde beacon, Bluetooth, Wi-Fi, ZigBee, cellular, ISM, or other wireless data communications module or system for wirelessly communicating data to and from other system devices.

For example, in some utility locating systems, such as that illustrated in FIG. 1, the clip may include a sonde beacon for generating, transmitting, and receiving communication signals, which may include command signals for controlling the clip device, with utility locator devices (e.g., locator device 750), transmitters that may contain one or more sonde beacons (e.g., transmitter 710), and/or other sonde equipped system devices. In other embodiments, such data may be sent to the locator device(s) 750 via an information carrying current signal coupled to a target utility line 760. For instance, the current signal transmitted onto target utility line 760 may be modulated (e.g., frequency shift keying, amplitude shift keying, phase shift keying, or the like) according to particular parameter selection data values or with other data or information. The locator device(s) 750 may then receive and measure the magnetic fields from the modulated current on target utility 760 and demodulate and process the received magnetic field signals to extract the communicated data. The communication module 726 may also include acoustic and/or visual indicators to communicate information such as a high voltage alert or improper clip device placement or connection to the user. For instance, indicator LEDs, graphical user interfaces, acoustic indicators or alarms may be included to communicate information directly to the user including, but not limited to, alarms for communicating connection to a high voltage utility line.

Clip embodiment 720 may further include an illumination element 728, which may be or share aspects with the illumination element such as LED 270 of FIG. 2G. The illumination element may be used to light up the conductor, utility, or other work area feature. Clip 720 may also include a utility selector element 732, which may be or include aspects of the utility selector subassembly 560 of FIGS. 5A-5C. The selector element may be used to determine a parameter selection via one or more magnetic sensors included in a sensor module 734. In some embodiments, the sensor module 734 may include high voltage sensors for detecting connection to a high voltage line and communicating such information to the user and/or actuating other fail safes to prevent using the clip device in such scenarios.

The sensor module 734 may further include global navigation systems (GNS) sensors/modules such as global position system (GPS) receiver modules, accelerometers, compass sensors, gyroscopic sensors, other inertial/position sensors, geophones, magnetic sensors, gas sensors, temperature sensors, environmental condition sensors, Sonde beacons and/or other sensors. In clip device embodiments containing a Sonde beacon, a locator device such as locator device 750 may track the Sonde beacon to determine and map its relative position. In other embodiments, sensor module 734 may include optical sensors for use in a camera within a clip device embodiment which may photograph the location or utility line onto which it may be secured.

In some embodiments, one or more attachment accessory devices 762 may connect to the clip device 720. Such attachment accessory devices 762 may further connect to the target utility 760 and/or one or more other additional utilities 764 to communicate signals therewith.

In use, transfer of data as previously described may be done to uniquely identify and map target utility lines. For instance, as illustrated in the locator interface 770 of FIG. 7B, once data associated with a target utility line is communicated with the locator device (e.g., through modulation of the current placed on the utility line, wireless communication between clip device or transmitter and the locator device, or the like), the locator may display the location of target utility lines 772 and 774 and indicate their identity through corresponding indicators 773 and 775, which may further indicate the apparent depth of each within the ground.

The locator interface 770 may also display other detected utility lines which may not be uniquely identified through a utility selector element. For instance, locator interface 770 displays utility line 776 with corresponding indicator 777 of apparent depth, which may not be a target utility having been uniquely identified through a utility selector element. Locator interface 770 may further include various other indicators such as frequency suite indicator 778, locator device battery life indicator 780 or system device battery life indicators 781, 782, 783, GPS status indicator 784, Bluetooth connectivity indicator 786, and Wi-Fi connectivity indicator 788.

Figure 7C:
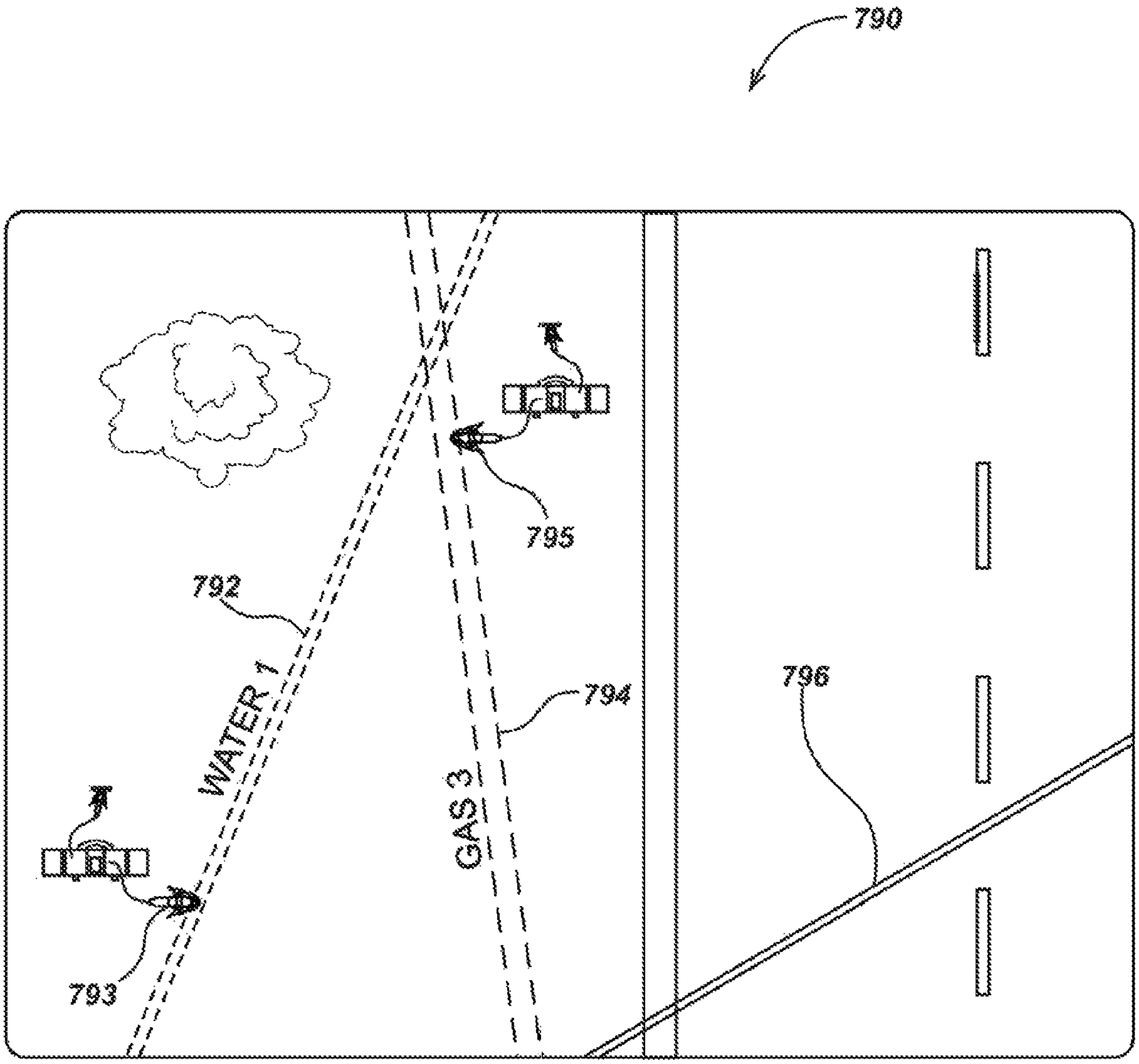
FIG. 7C is an exemplary utility mapping system using data provided by a utility selector element embodiment.

Likewise, the utility data may be communicated to an electronic computing device for use in mapping buried utility lines. For example, as illustrated in FIG. 7C, a utility mapping system 790 may display uniquely identified target utility lines 792 and 794 relative to their position and orientation within the Earth. Utility mapping system 790 may also display corresponding clip locations 793 and 795 relative to the Earth's surface. For instance, in some embodiments the clip location may be indicated by a user at placement.

In other embodiments, the clip may include a sonde (magnetic field dipole signal generator, typically compact and battery powered) for broadcasting a signal that is measureable at one or more locators. The locator(s) may determine the location of the clip from the measured broadcast signal from the sonde. The position may be stored and later transferred to a mapping system or other like electronic computing system for use in post processing mapping or transferred in real-time or near real-time to such mapping or computing systems.

In other embodiments, a clip may include a global navigation system receiver, such as a GPS receiver module, for determining its geolocation relative to the Earth's surface. This may then be communicated to other system devices and/or computing and mapping systems, in either real-time or near real-time or stored for use in post processing. Other utility lines, such as utility line 796, which may not have been identified through utility selector elements or are otherwise identified, may also be mapped based on received magnetic field signals.

Figure 8:
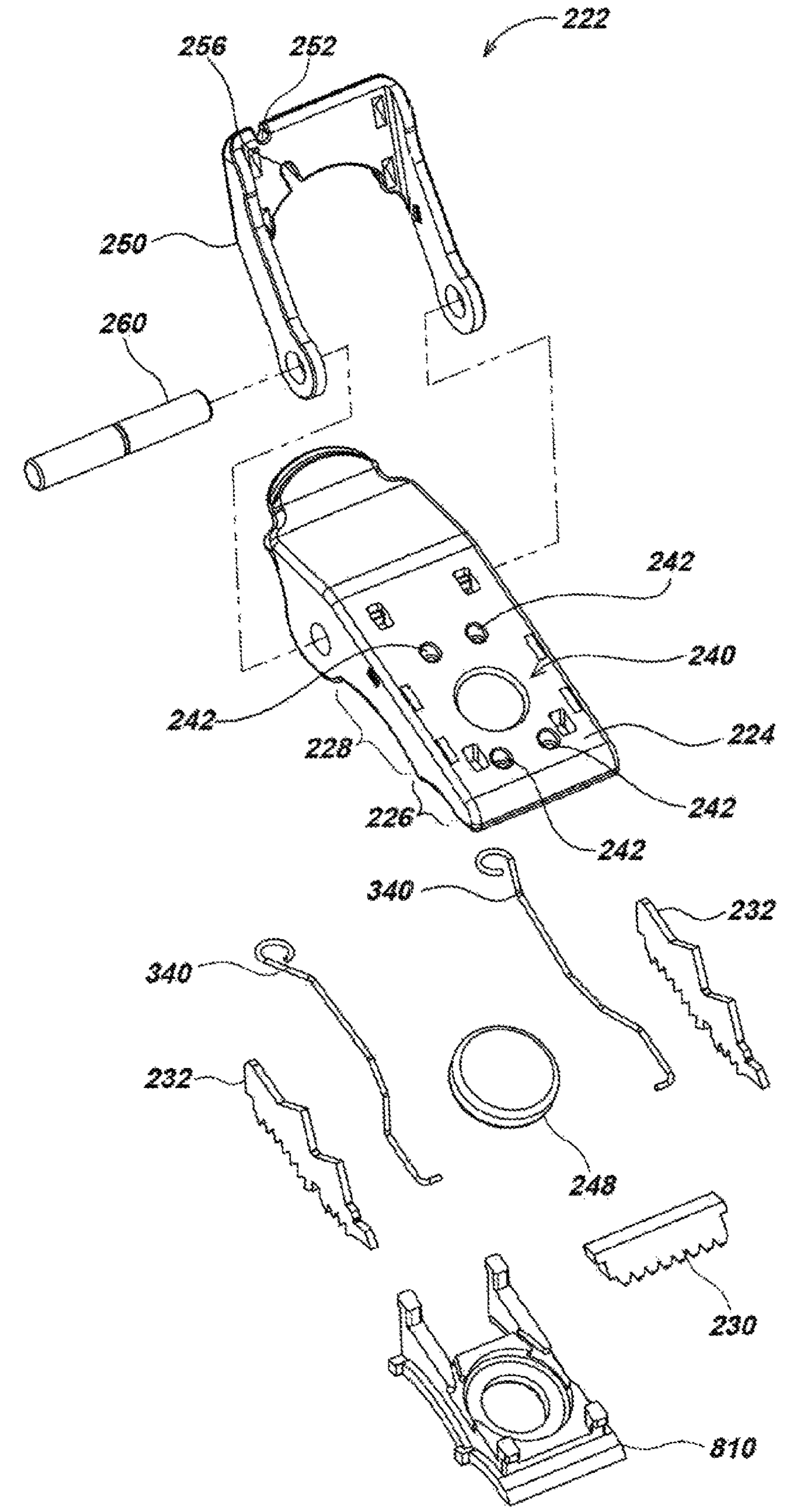
FIG. 8 is an exploded view of an individual jaw subassembly embodiment.

Turning to FIG. 8, each individual jaw subassembly 222 may include a magnet 248, which may seat within each jaw base 224 and secure thereto via magnet retainer 810. The magnet 248 may provide a magnetic attractive force in securing or aiding in securing clip device 110 (as shown in FIGS. 1-2G) to a target utility. Each individual jaw subassembly 222 may include a series of jaw wires 340 that may seat within the jaw base 224 and establish an electrical contact between the springs 218 (FIG. 2B) and serrated conductive contact elements 230 and 232. The jaw wires 340 may further contact magnets 248, which may be electrically conductive, for further communicating signal(s) to optional attachment accessory devices (e.g., insulation punch attachment accessory 1140 of FIGS. 11B-11D or accessory clip device 1150 of FIGS. 11E-11F).

Figure 9A:
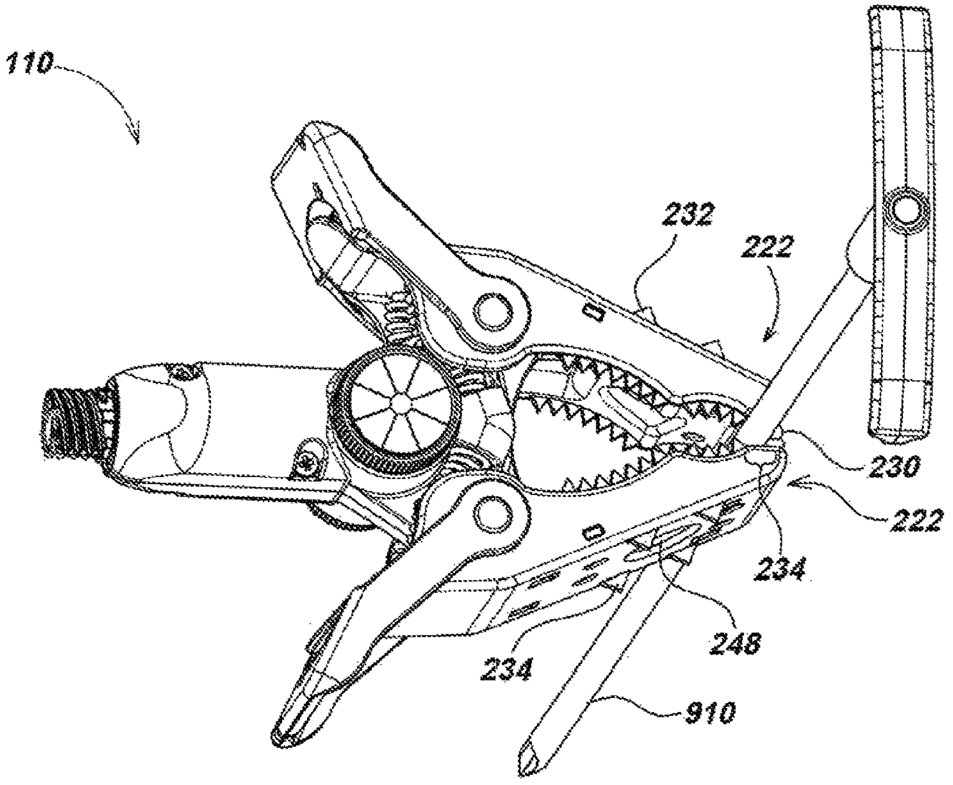
FIG. 9A is an illustration of use of a clip embodiment securing to a ground stake.
Figure 9B:
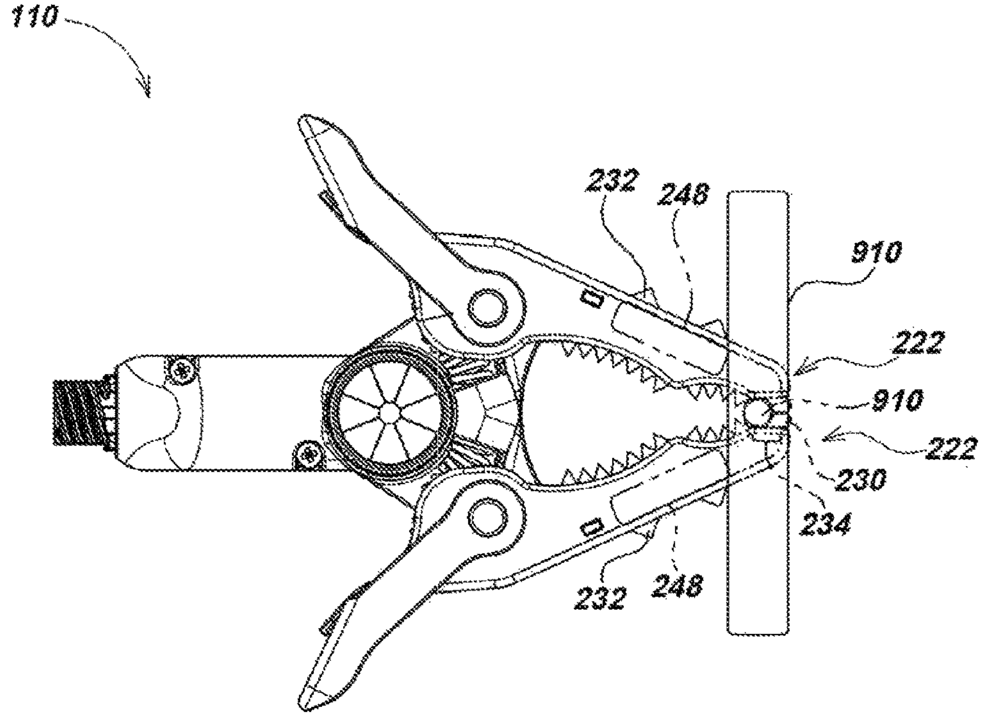
FIG. 9B is a side view of the clip embodiment and stake of FIG. 9A.
Figure 9C:
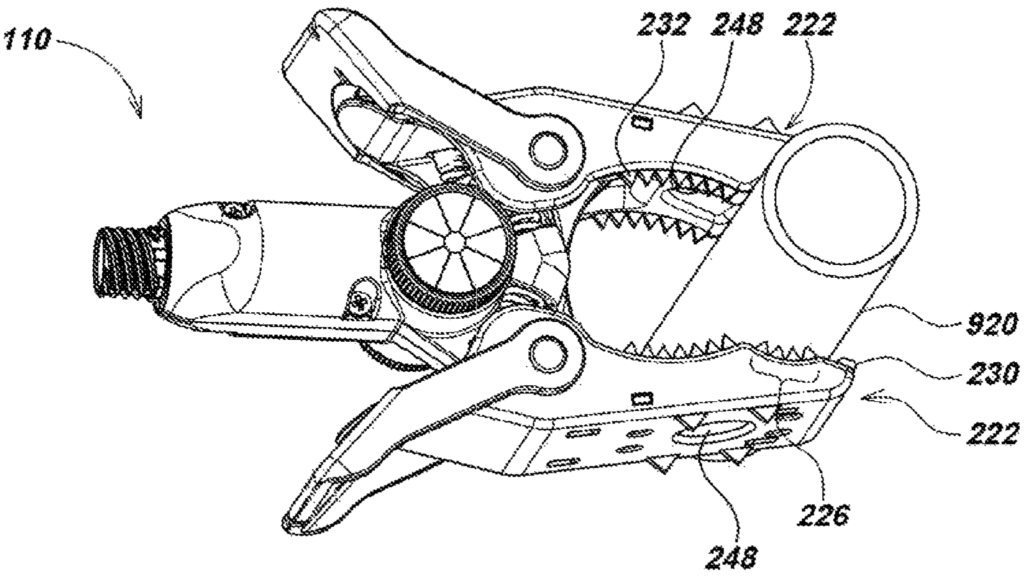
FIG. 9C is an illustration of use of a clip embodiment securing to a small diameter pipe.
Figure 9D:
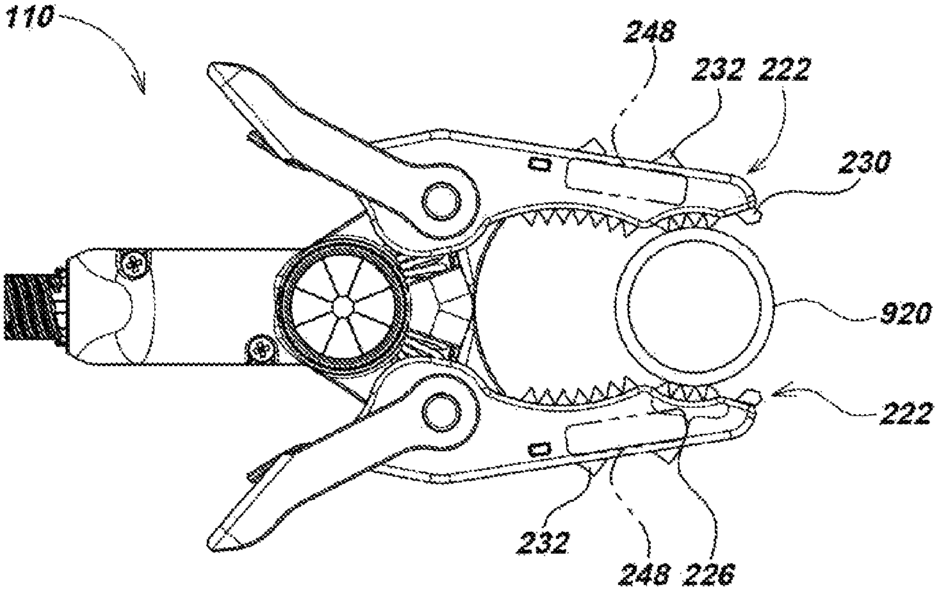
FIG. 9D is a side view of the clip embodiment and small diameter pipe of FIG. 9C.
Figure 9E:
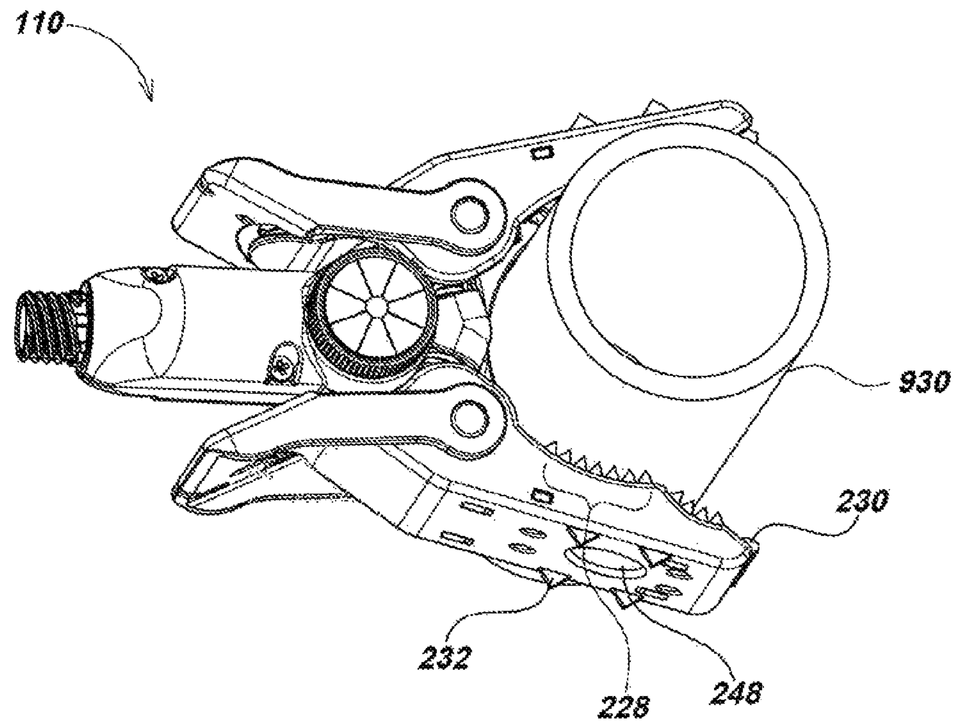
FIG. 9E is an illustration of use of a clip embodiment securing to a medium diameter pipe.
Figure 9F:
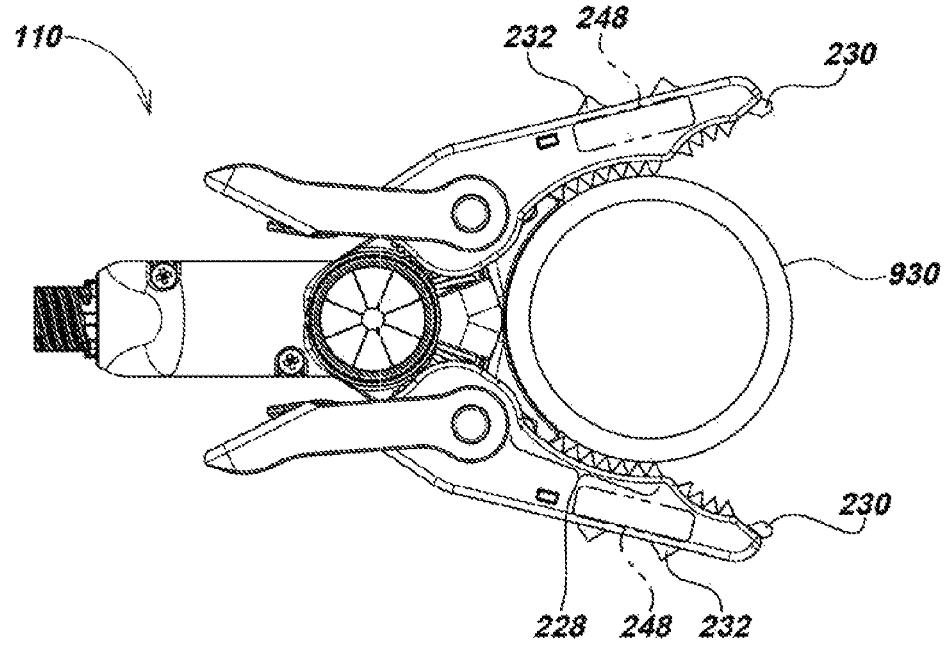
FIG. 9F is a side view of the clip embodiment and medium diameter pipe of FIG. 9E.

Turning to FIGS. 9A-9H and 9J-9K, clip embodiment 110 is illustrated in various use configurations. As illustrated in FIGS. 9A and 9B, clip 110 may secure to a ground stake 910, providing a pathway for return current. As illustrated, clip 110 may grasp ground stake 910 within contact region 234 (better illustrated in FIG. 2A), which may be dimensioned specifically for use with the shape of the ground stakes (such as those widely used in the art, for example ground stake 910).

As illustrated in FIGS. 9C-9H, clip 110 may be configured for use with different diameter pipes, such as industry standardized pipe sizes that are used for utility lines. For instance, pipe 920 of FIGS. 9C and 9D may have an outer diameter of 1 inch, which may be grasped securely within first contoured region 226 (better illustrated in FIG. 2A), whereas a medium diameter pipe 930 of FIGS. 9E and 9F, which may have between 1 inch to 2.5 inches outer diameter, may be better and more securely grasped within the second contoured region 228.

Figure 9G:
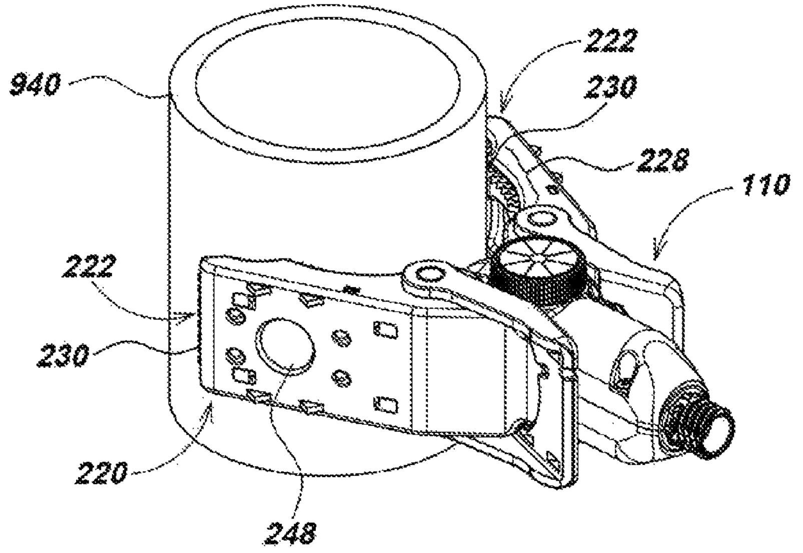
FIG. 9G is an illustration of use of a clip securing to a large diameter pipe.
Figure 9H:
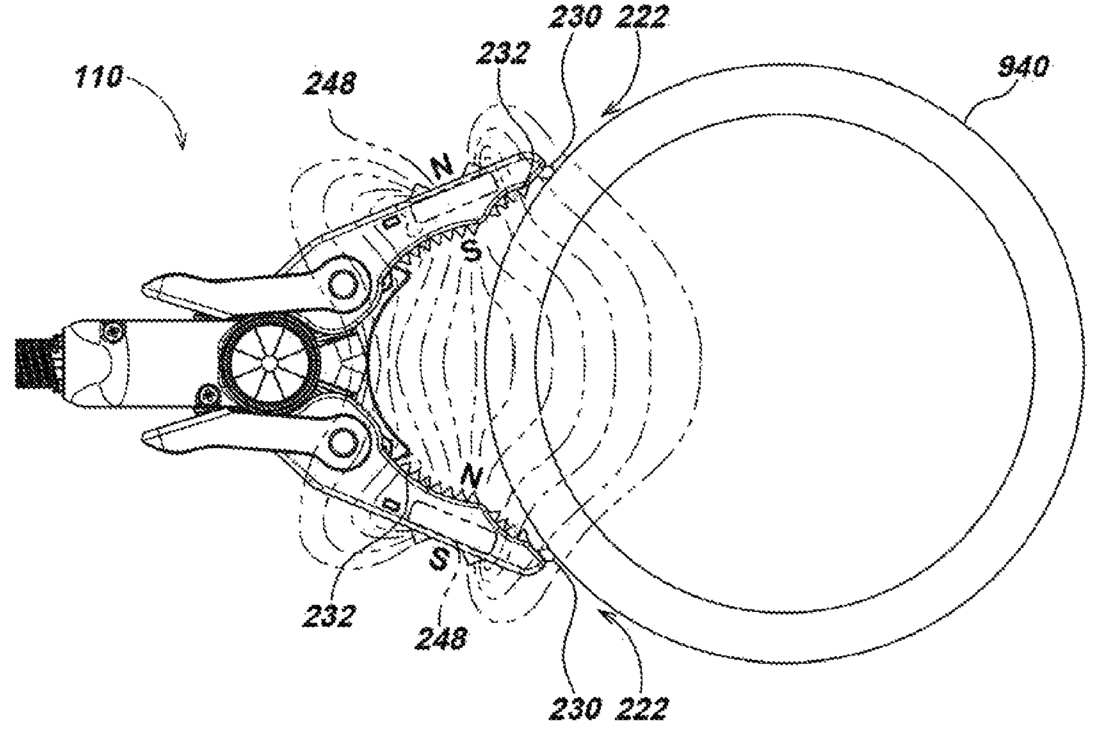
FIG. 9H is a side view of the clip embodiment and large diameter pipe of FIG. 9G.

As illustrated in FIGS. 9G and 9H, in some use configurations the double-acting jaw assembly 220 of the clip 110 may fail to or otherwise not fully grasp onto large diameter utility lines (e.g., pipes with a 2.5-6 inches outer diameter) such as pipe 940. In such uses, the clip 110 may contact the pipe 940 near the first contoured region 226 and secure thereto through the magnetic attractive force supplied by magnets 248 within each individual jaw assembly 222.

Figure 9I:
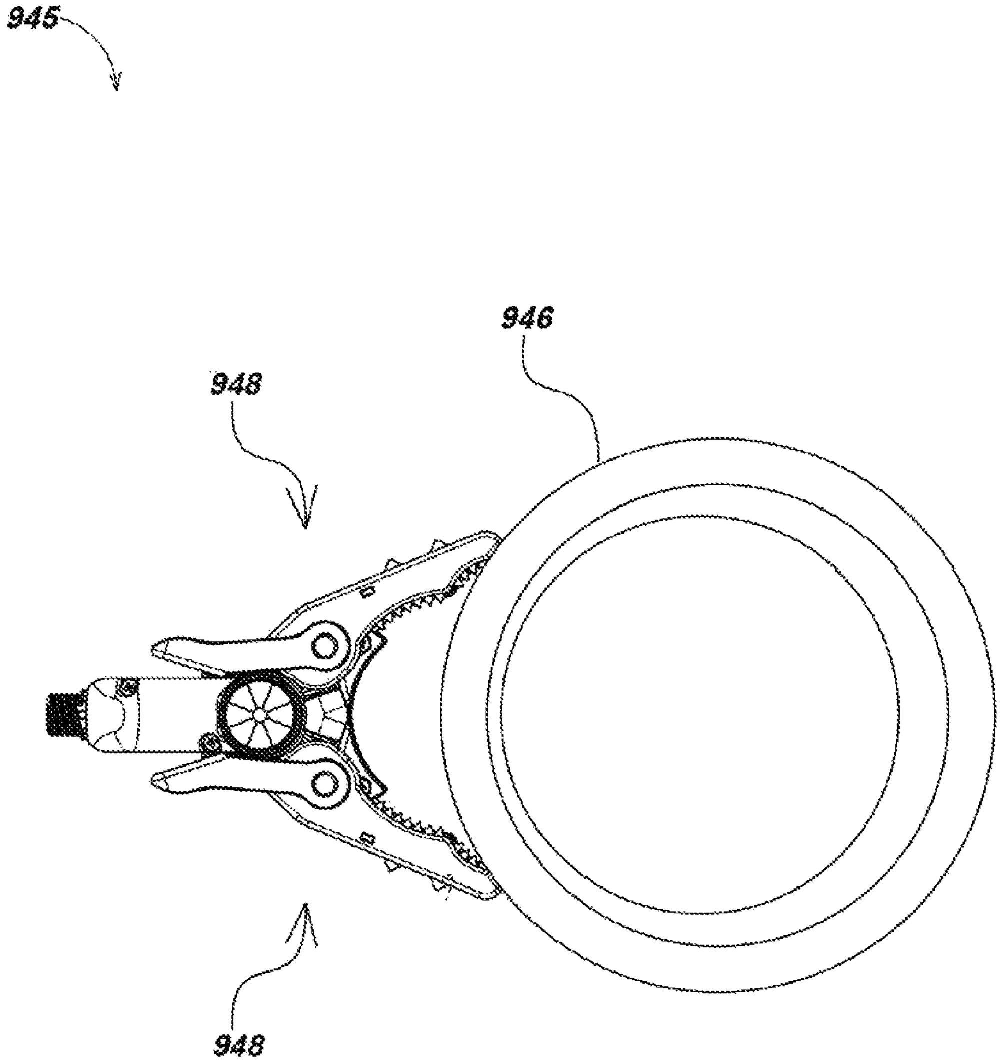
FIG. 9I is a photograph of the clip embodiment secured to a large diameter pipe.
Figure 9J:
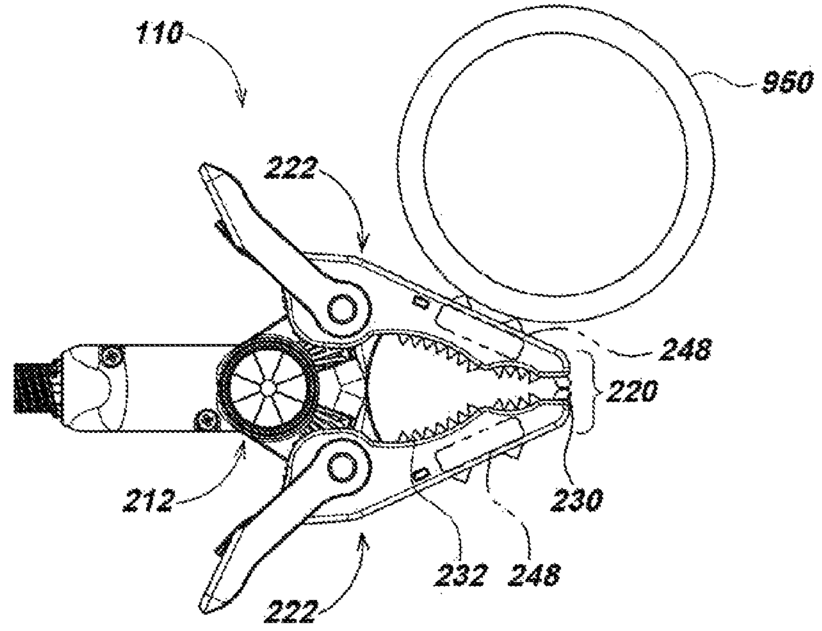
FIG. 9J is an illustration of use of a clip device securing to a pipe via magnetic attractive force.

As shown in FIG. 9I, a clip device embodiment 945 may secure to the pipe 946 via magnets (not shown) within each individual jaw assembly 948. Turning to FIG. 9J, the outer surface of clip device 110 may secure to pipe 950 through the attractive force of magnet 248 (as shown in FIG. 2E) and establish electrical contact thereto via serrated conductive contact elements 232 extending along the outer surface of each individual jaw subassembly 222.

Figure 9K:
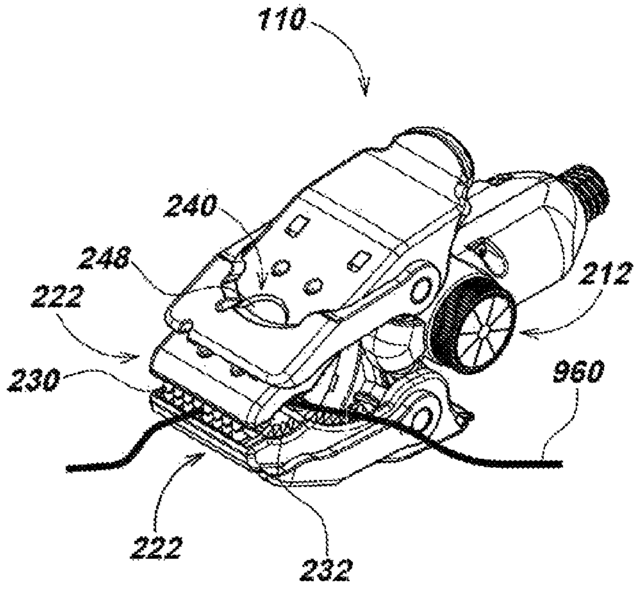
FIG. 9K is an illustration of use of a clip device securing to a wire.

In other use configurations, as illustrated in FIG. 9K, the clip 110 may, via front serrated conductive contact elements 230, grasp onto bolt or screw heads, wires, or other small diameter target utilities, such as wire 960, which may be approximately 24 AWG or larger wire.

Figure 10A:
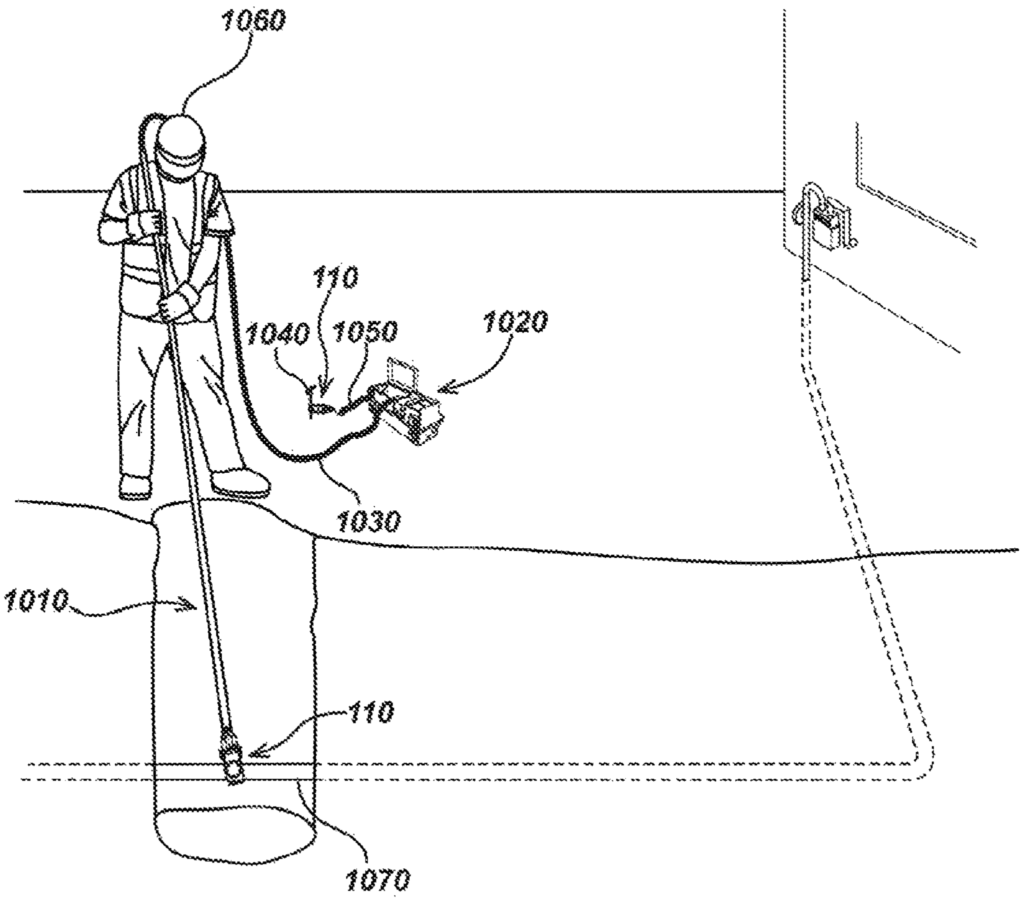
FIG. 10A is an illustration of a utility locating system embodiment utilizing a clip device with an extension pole accessory.

In some use configurations, an extension pole accessory may be used to aid a user in reaching target utilities in difficult to reach places. For example, as illustrated in FIG. 10A, clip embodiment 110 may secure to the end of an extension pole accessory 1010, further connected to a transmitter 1020 via a cable 1030. A second clip 110 may secure to a ground stake 1040, which may be connected to transmitter 1020 via cable 1050. A user 1060 may hold the extension pole accessory 1010 to move the clip 110 towards a difficult to reach target utility line 1070. The user may actuate the extension pole accessory 1010 causing the clip 110 to open, allowing the clip 110 to grasp the target utility 1070.

Figure 10B:
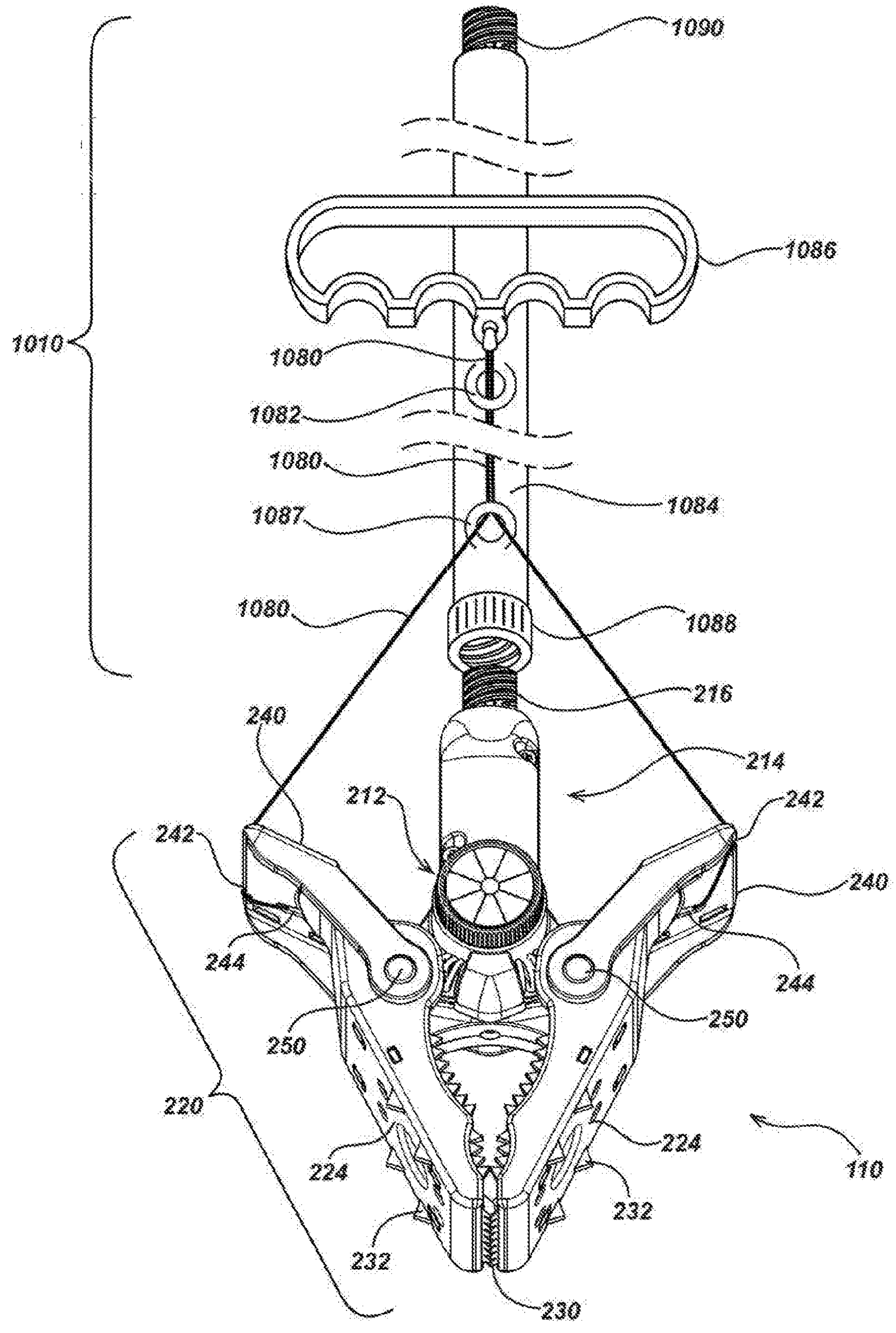
FIG. 10B is a detailed view of the clip device and extension pole accessory from FIG. 10A.

As illustrated in FIG. 10B, opening of the clip embodiment 110 may be implemented using one or more pull strings 1080 that may secure to notches 254 and 256 formed on cover 250. The pull string(s) 1080 may further secure within retainers 1082 formed along and holding the pull string(s) 1080 to the length of the body 1084 of extension pole accessory 1010 such that the pull string(s) 1080 may be permitted to still move along the length of the body 1084 of extension pole accessory 1010. A handle 1086 may secure to the end of the pull string(s) 1080 furthest from the clip device 110 allowing a user to grip the handle 1086 and pull, thus pulling the pull strings 1080 secured to covers 250 and open the double-acting jaw assembly 220 of clip 110.

The extension pole accessory 1010 may include threaded ends 1088 and 1090 allowing the extension pole accessory 1010 to mate with the threaded cable terminal 216 of the clip 110 on one end and threads of a cable which may further connect to a transmitter such as the cable 1030 and transmitter 1020 of FIG. 10A. It is noted that extension pole accessory 1010 may communicate signal current between the clip 110 and cable that may further be connected to a transmitter such as the cable 1030 and transmitter 1020 of FIG. 10A.

Figure 11A:
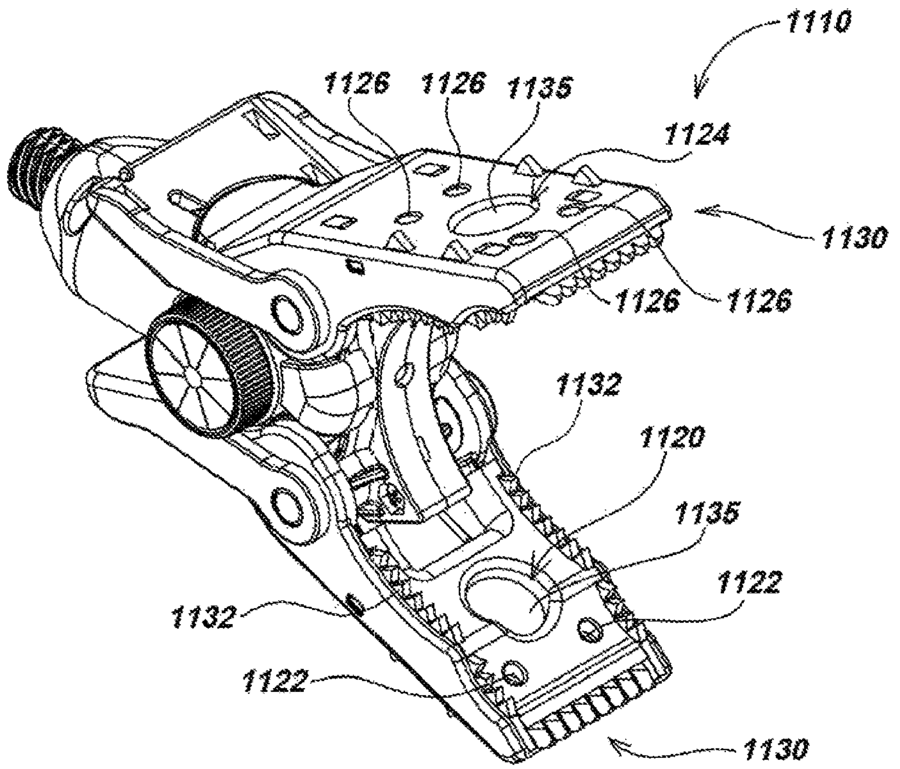
FIG. 11A is a detailed isometric view of a clip embodiment.
Figure 11B:
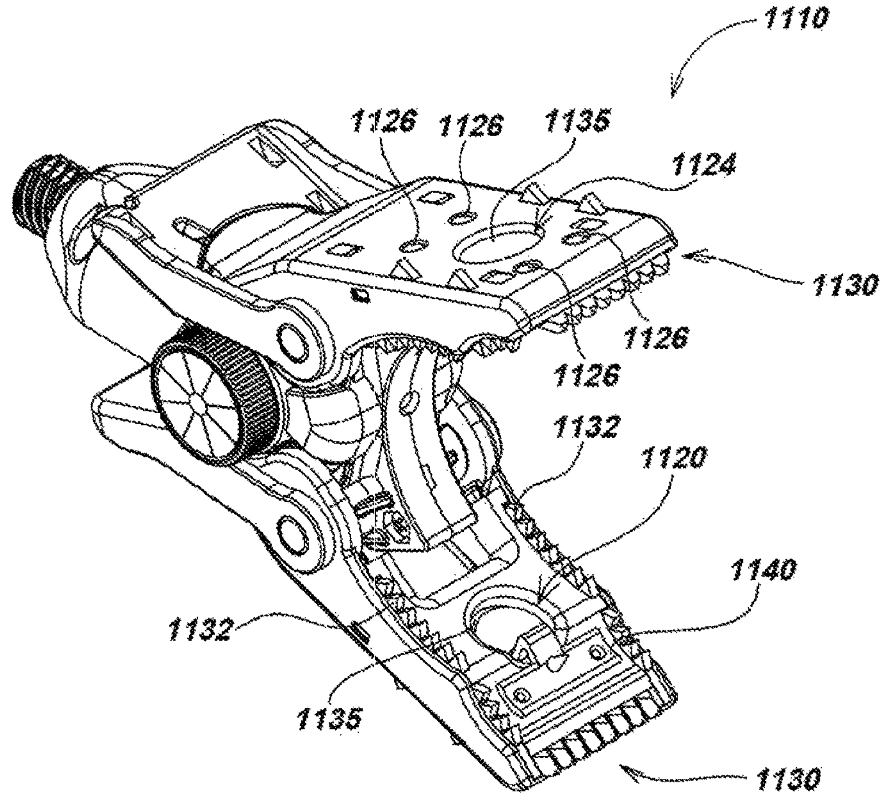
FIG. 11B is a detailed isometric view of the clip embodiment from FIG. 11A with a magnetically secured insulation punch attachment accessory.

In some clip device embodiments, other accessory attachment devices may be included. For example, as illustrated in FIGS. 11A and 11B, clip embodiment 1110, which may be or share attributes of the clip device 110 described in conjunction with FIGS. 1-4D, 5-6F, and 8-10B, the clip device 720 of FIG. 7A, or other clip devices described herein, may include internal accessory ports 1120 with keying features 1122 within one or more of the double-acting jaw subassemblies 1130 and external accessory ports 1124 with keying features 1126 along the outside of the one or more double-acting jaw subassemblies 1130. In use, the internal accessory ports 1120 and external accessory ports 1124 may allow connecting of accessory devices that may be keyed to keying features 1122 or 1126 and further be held in place through the attractive force of magnets 1135 internal to each double-acting jaw subassembly 1130. Signal(s) may be communicated with accessory devices by physical contact with the electrically conductive magnets 1135 and/or through physical contact of other contact elements such as the serrated conductive contact elements 1132.

As illustrated in FIG. 11B, an insulation punch attachment accessory 1140 may secure within one of the internal accessory ports 1120 (as shown in FIG. 11A) and secure thereto. The insulation punch attachment accessory 1140 (as shown in FIG. 11B) may aid in puncturing the insulation around wires or the like thus allowing the clip device 1110 to make electrical contact with such target utilities.

Figure 11C:
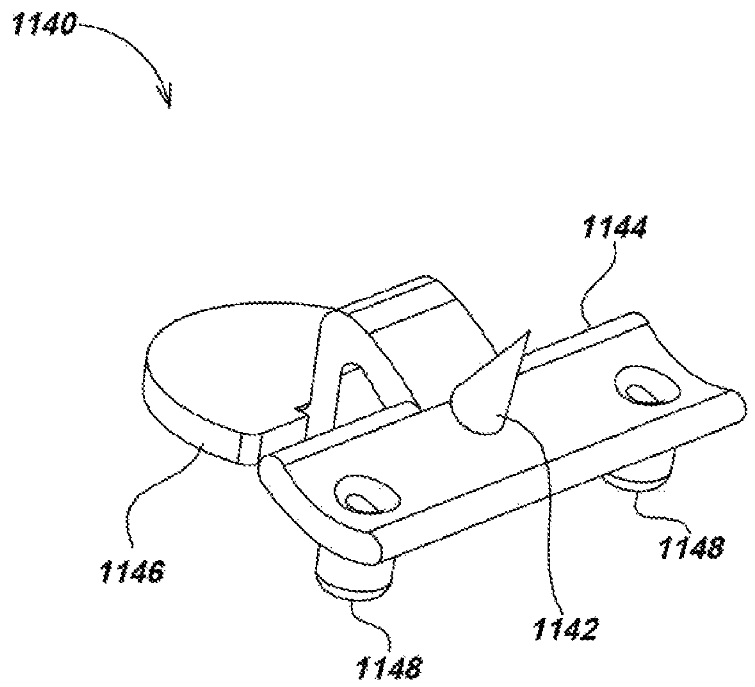
FIG. 11C is a detailed view of the top of the insulation punch attachment accessory from FIG. 11B.
Figure 11D:
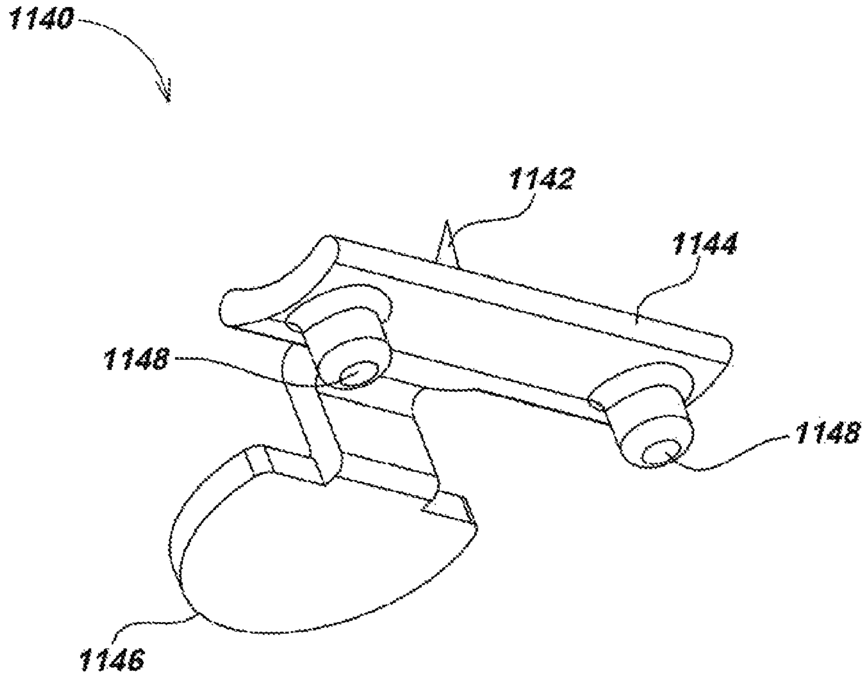
FIG. 11D is a detailed view of the bottom of the insulation punch attachment accessory from FIG. 11B.

Further illustrated in FIGS. 11C and 11D, the insulation punch attachment accessory 1140 may have a spike 1142 located on a base 1144 for penetrating the insulation or jacketing of wiring or like target utilities and physically contacting the conductive core therein to establish an electrical connection. A magnet contact feature 1146 may extend from base 1144 to contact, and be held in place by, one of the magnets 1135 (as shown in FIGS. 11A-11B) further establishing electrical pathway(s) between the magnet (as shown in FIGS. 11A and 11B), and thereby clip 1110 and a further connected transmitter (not illustrated), and the insulation punch attachment accessory 1140. A series of nubbins 1148 may be formed along the bottom of base 1144 which may align and key into the keying features 1122 (as shown in FIG. 11A) on clip 1110 (as shown in FIGS. 11A and 11B).

Figure 11E:
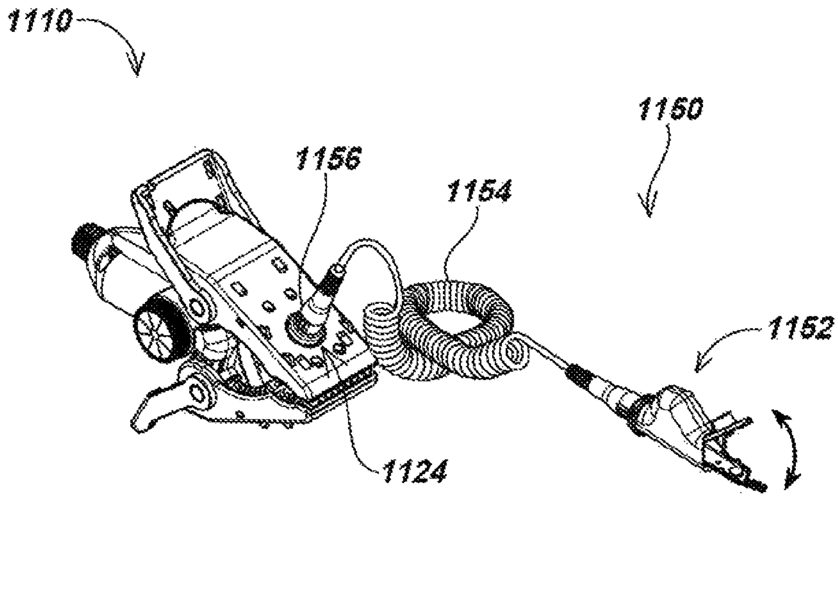
FIG. 11E is a detailed isometric view of the clip device from FIG. 11A with an accessory clip device.
Figure 11F:
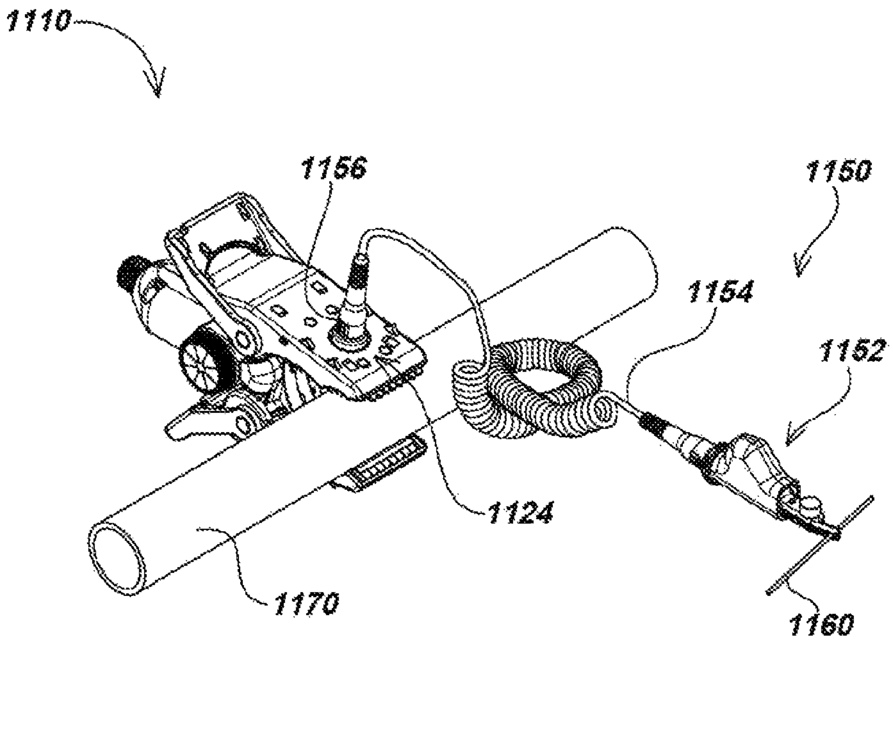
FIG. 11F is a detailed isometric view of the clip device and accessory clip embodiment of FIG. 11E secured to a pipe and a wire.

Turning to FIGS. 11E-11F, an accessory clip device embodiment 1150 may secure to an accessory port, such as the external accessory ports 1124 on clip embodiment 1110. The accessory clip 1150 may include a clip element 1152 for clipping onto a second target utility such as wire 1160 (FIG. 11F), a cable 1154, and a magnetic connector 1156 for connecting the accessory clip 1150 to clip 1110.

As illustrated in FIG. 11F, clip embodiment 1110 may secure to a first target utility line 1170, and the accessory clip embodiment 1150 may secure to a second target utility, such as wire 1160. In some such embodiments, for instance wherein the clip connects to a transmitter via a multi-wire cable, the same and/or different current signals and/or data signals may be communicated with the clip device, accessory clip device, and/or other attachment accessories. Likewise, in some implementations, multiple attachment accessories may be used at the same time, and each may be connected to different target utilities.

Figure 12:
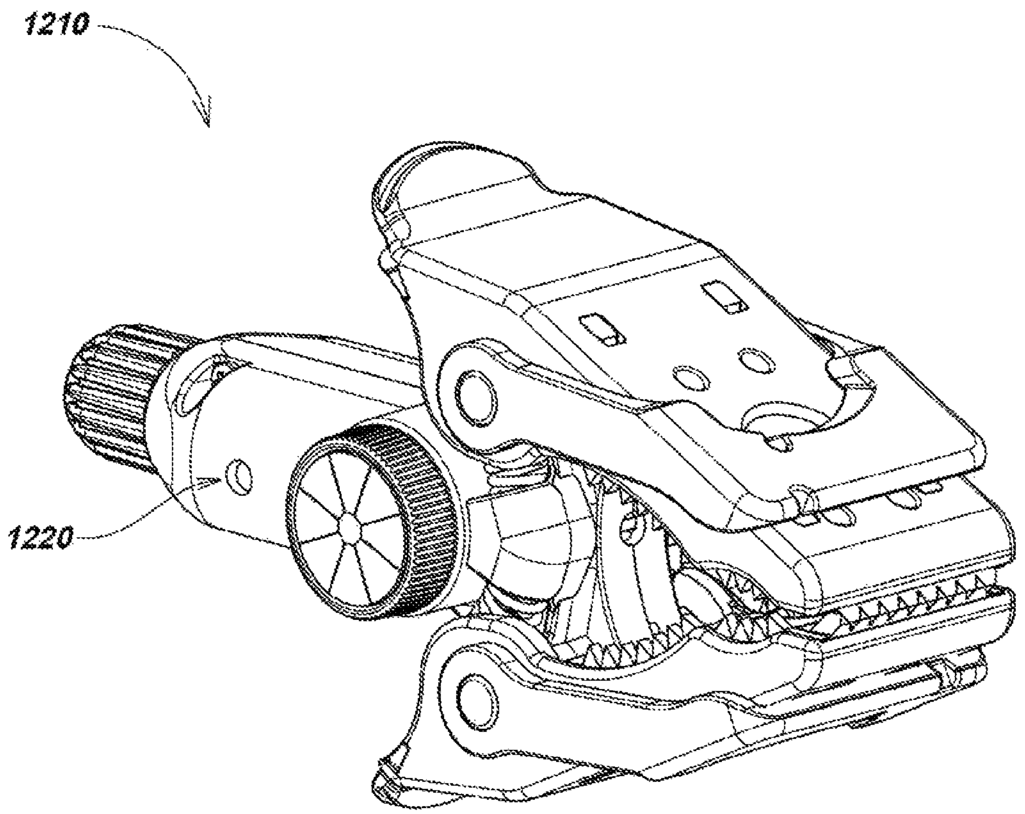
FIG. 12 is a detailed isometric view of the clip embodiment of FIG. 11A.

Clip embodiments in accordance with the present disclosure may further include one or more lights or other visual, audible, and/or other status indicators for alerting a user to particular data or conditions. For instance, as illustrated in FIG. 12, a clip embodiment 1210, which may be or share attributes of the clip embodiment 110 described in conjunction with FIGS. 1-4D, 5-6F, and 8-10B, the clip device 720 of FIG. 7A, the clip device 1110 of FIGS. 11A-11B and 11E-11F, and/or other clip devices described herein, may further include one or more status LEDs 1220 (or other audible, visible, or tactile outputs not shown) for communicating information to a user. The LEDs 1220 may, for instance, indicate that a proper or improper connection is made with a target utility, as well as high voltage warnings, connection to a transmitter, changing of utility selector parameters, and the like. In other embodiments, other types of indicators may instead or additionally be used including but not limited to acoustic warning devices or modules and/or graphical user interfaces and associated processing elements and electronic circuitry.

In one or more exemplary embodiments, the electronic functions, methods, and processes described herein may be implemented in whole or in part in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer.

As used herein, an electronic computing device or system may be any of a variety of electronic devices including computing/processing functionality, memory, and associated peripherals. Examples includes notebook computer systems, tablet devices, smart phones, server systems, database systems, as well as other devices with computer processing, memory, I/O and associated elements for receiving, sending, storing, processing, displaying, archiving, and otherwise processing electronic data and information.

By way of example, and not limitation, such computer-readable media can include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media The various illustrative functions and circuits described in connection with the embodiments disclosed herein with respect to the various described functions may be implemented or performed in one or more processing elements with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The presently claimed invention is not intended to be limited just to the aspects shown herein, but is to be accorded the full scope consistent with the specification and drawings, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c.

The previous description of the disclosed aspects is provided to enable any person skilled in the art to make or use embodiments of the invention. Various modifications to these aspects will be readily apparent to those skilled in the art, and the generic principles defined herein may be applied without departing from the spirit or scope of the disclosure. Thus, the presently claimed invention is not intended to be limited to the aspects shown herein but is to be accorded the widest scope consistent with the appended claims and their equivalents.

We claim:

1. A utility locating system, comprising:

a utility locating transmitter having a current output connector; and a clip including:

a conductor operatively coupled to the current output connector to receive a current signal therefrom;

a base assembly;

a double-acting jaw assembly operatively coupled to the conductor, with each jaw coupled to the base assembly and independently movably openable and closeable; and a contact element on the jaw assembly.

2. The system of claim 1, wherein the double-acting jaw assembly includes a plurality of regions or sections shaped to fit in close contact about a plurality of target utilities of different utility types and/or diameters.

3. The system of claim 1, wherein the contact element includes a plurality of serrated conductive teeth for gripping a target utility.

4. The system of claim 3, wherein the serrated conductive teeth are located along the inner portion of the jaw assembly within different contoured regions shaped to fit in close contact about different ones a plurality of target utilities of different shapes or diameters.

5. The system of claim 1, further comprising a magnetic element providing a magnetic attractive force to secure or aid in securing the contact element to the target utility.

6. The system of claim 5, wherein the serrated conductive teeth are located along the outer portion of the jaw assembly allowing the magnets to secure the contact element to a target utility by magnetic attractive force.

7. The system of claim 5, including one or more accessory ports for attaching accessory devices to the clip via the magnetic element.

8. The system of claim 1, wherein the magnetic element is also electrically conductive to communicate one or more signals to one or more accessory devices.

9. The system of claim 7, wherein one attachment accessory device comprises an insulation punch for puncturing the insulation of wiring so as to provide a direct physical contact with the conductor of the wire.

10. The system of claim 1, wherein the contact element is shaped with a plurality of curvatures to provide electrical contact for coupling current signals to a plurality of different diameter conductors and the contact element includes a plurality of serrated conductive teeth for gripping a target utility.

11. The clip of claim 10, wherein the serrated conductive teeth are located along the inner portion of the jaw assembly within different contoured regions shaped to fit in close contact about different ones a plurality of target utilities of different shapes or diameters.

12. The clip of claim 10, further comprising a magnetic element providing a magnetic attractive force to secure or aid in securing the contact element to the target utility.

13. The clip of claim 10, further including an extension pole accessory.

14. The clip of claim 13, further including one or more pull strings to actuate the clip from the extension pole accessory.

15. The clip of claim 10, further including one or more accessory ports with keying features.

16. The clip of claim 10, further including an insulation punch attachment accessory including a spike for penetrating the insulation of an electrical conductor.

17. The clip of claim 10, further including one or more lights disposed thereon.

18. The clip of claim 17, wherein the one or more lights are LEDs.

19. A utility locating system, comprising:

a utility locating transmitter having a current output connector; and a clip including:

a conductor operatively coupled to the current output connector to receive a current signal therefrom;

a base assembly;

a double-acting jaw assembly operatively coupled to the conductor, with each jaw coupled to the base assembly and independently movably openable and closeable;

a contact element on the jaw assembly; and a magnetic element providing a magnetic attractive force to secure or aid in securing the contact element to the target utility;

wherein the double-acting jaw assembly includes a plurality of regions or sections shaped to fit in close contact about a plurality of target utilities of different utility types and/or diameters, the contact element includes a plurality of serrated conductive teeth for gripping a target utility, and the serrated conductive teeth are located along the inner portion of the jaw assembly within different contoured regions shaped to fit in close contact about different ones a plurality of target utilities of different shapes or diameters.

20. The system of claim 19, wherein the magnetic element is also electrically conductive to communicate one or more signals to one or more accessory devices.

* * * * *